INVENTORS
Eugene Leonard
Edward M. Richards
Miles Skrivanek, Jr
Edgar Wolf
Marvin Shapiro
BY Yates & Spicens
ATTORNEY

SERIAL INFORMATION TRANSFER SYSTEM

Original Filed March 12, 1962 7 Sheets-Sheet 2

SERIAL INFORMATION TRANSFER SYSTEM

Original Filed March 12, 1962 7 Sheets-Sheet 3

SERIAL INFORMATION TRANSFER SYSTEM

Original Filed March 12, 1962

TRANSMIT MODE WITH PARITY CHECK, INSERTION OF IGNORE CHARACTERS, AND END OF BLOCK DETECTION

TRANSMITTER ACKNOWLEDGE MODE, RETRANSMIT MODE & DISCONNECT

SERIAL INFORMATION TRANSFER SYSTEM

Original Filed March 12, 1962 7 Sheets-Sheet 6

RECEIVER: RECEIVE MODE; PARITY CHECK; IGNORE; ACKNOWLEDGE MODE; AND DISCONNECT.

June 6, 1967 E. LEONARD ETAL 3,324,460

SERIAL INFORMATION TRANSFER SYSTEM

Original Filed March 12, 1962 7 Sheets-Sheet 7

SEARCH EDIT

United States Patent Office 3,324,460

Patented June 6, 1967

3,324,460

SERIAL INFORMATION TRANSFER SYSTEM

Eugene Leonard, Sands Point, Edward M. Richards, East Northport, Edgar Wolf, New Hyde Park, Marvin Shapiro, Huntington, and Miles Skrivanek, Jr., Glenwood Landing, N.Y., assignors to Digitronics Corporation, Albertson, N.Y., a corporation of Delaware Original application Mar. 12, 1962, Ser. No. 180,435. Divided and this application Mar. 16, 1966, Ser. No. 539,248

(Filed under Rule 47(a) and 35 U.S.C. 116)

13 Claims. (Cl. 340—172.5)

This invention pertains to information transfer systems and is a division of our copending application Ser. No. 180,435, for Information Transfer System, filed Mar. 12, 1962, now Patent No. 3,284,774.

Heretofore, digital information was transmitted between remote stations over private telephone or telegraph lines. These systems have several serious limitations in view of the ever increasing need for high speed and long distance transmission of information between cities or even across the continent.

A disadvantage of such systems is lack of means for detecting and checking for errors in the transmitted information. Formerly, the type of information was such that errors could be tolerated. However, present day data handling systems demand virtually error-free information or at least means which indicate that an error is present in the information.

There has become recently available telephone equipment which permits the transfer of data over conventional telephone lines and which enables direct dialing of a receiving or transmitting station and then transfer of the information via the present telephone system through switchboards and exchanges to a subscriber set at a remote installation. Such apparatus removes the necessity for, and reduces data transmission cost in relation to privately owned or leased telephone or telegraph lines since the user pays only for the on-line-time. However, such telephone equipment is unreliable as regards accuracy of the information transferred. It is well known that conventional telephone lines are quite often noisy. During voice communication, the noise on a line is quite often of no consequence since the conversing parties can either repeat the garbled words or can mentally decipher their meaning. Also, when the parties sense a noisy connection, they can disconnect and initiate a new connection.

However, when digital information is transferred over these lines, the noise can destroy units of information or can introduce errors into the units of information.

Furthermore, in contrast with voice communication the transmitted coded information cannot be readily followed from context, aurally or otherwise. In this sense, the opportunity to disconnect and reconnect is not available. Therefore, if the telephone line is noisy, the user will be paying for the time he is on the line, whether or not useful information is being transferred.

It is desirable in the ideal, that the telephone line user pay only for the time during which useful information is being transmitted.

It is accordingly a general object of the invention to provide an improved information transfer system which permits the transmission of a maximum amount of reliable information in a minimum period of time.

It is another general object of the invention to provide apparatus for high speed data transmission over public lines wherein only the band-width of the line limits the data transfer rate.

In some information transfer systems, the input means includes a record medium which stores the units of information serially. The record medium is then moved in a forward or reverse direction past a transmitting means which senses the units of information and transfers them as sensed. In such a system, the units of information are grouped into records which include at least one record unit of information at the end of the record and a plurality of data units of information. In order to ensure that there is an error-free transmission of information, it is quite often desirable to divide the records into blocks and to transmit each block stepwise. That is, one block is transferred. Then it is determined whether there has been an error in the block transferred. If an error is detected, the block will be retransmitted.

It is accordingly an object of one aspect of the invention to provide such apparatus.

More particularly, this aspect of the invention contemplates a system for serially transferring information consisting of data units of information which are grouped into records with a record unit of information at one end of the record and a plurality of data units of information. The system comprises input means which include a record medium for storing in a serially available manner the units of information to be transferred and means for causing the record medium to serially transfer the units of information in a first or second and reverse direction. Control means are provided for initially causing the input means to serially transfer in the first direction. Means are also provided for generating a time interval and for sensing for the record units of information during the transfer. Counting means accumulate a count of the record units of information sensed. Means indicate when a block of information has been transmitted, that is when the first record unit of information is sensed after the end of the time interval. The counting means temporarily stores the count representative of the number of records transferred in the block. Other means are provided for sensing for errors in the units of information transferred in the block. If an error has been detected, means cause the record medium to move in the reverse direction and serially transfer the information. While the record medium is serially transferring in the reverse direction, the record units of information are again sensed and as each record unit of information is sensed a deaccumulation of the stored count in the counting means is performed. This deaccumulation continues until the stored count reaches its previous initial value. At this time, a control signal is generated for causing the input means to stop transferring in the reverse direction and to start transferring in the first direction.

A further feature of the invention is the provision of a remote receiving means which includes the error sensing means so that if an error is detected in the received information at the remote receiving means, the remote receiving means transmits a control signal which causes the retransmission.

A further feature of this aspect of the invention is means for recording the number of times a retransmission is performed and for terminating the transfer if the retransmissions exceed a predetermined number.

Quite often the information transfer system includes an output device in which the units of information are recorded serially. If some of the records contain erroneous units of information, it is desirable at a later time to edit the received information so that only records are present which contain error-free information.

It is accordingly a general object of another aspect of the invention to provide apparatus for performing this function.

It is a more specific object of this aspect of the invention to provide apparatus for transferring information in blocks comprising a plurality of records wherein it is possible to delete sequentially received plurality of blocks when there is erroneous information in the blocks.

Briefly, in accordance with this aspect of the invention, apparatus is provided for handling messages consisting of units of information that are serially transferred and grouped into records wherein a plurality of records constitute a block. The apparatus includes: means for serially transmitting the units of information; means for receiving and storing the units of information serially on a storage medium; counting means for accumulating the count of the records transferred in each block; and detecting means for detecting errors in the units of information transferred. When an error is detected, means responsive to the counting means insert a record count in the block to indicate the number of records in the block.

According to a feature of this aspect of the invention, means are also provided for receiving the blocks so transferred and for sensing for the record count to prevent the receiving of a number of records indicated by the record count number.

Other objects, features and advantages of the various aspects of the invention will be apparent from the following detailed description when read with the accompanying drawings wherein:

FIGURE 5 shows the flow of signals between various units of the transmitter during the Acknowledge, Retransmit and Disconnect modes;

GENERAL STRUCTURE OF INFORMATION

Figure 1:
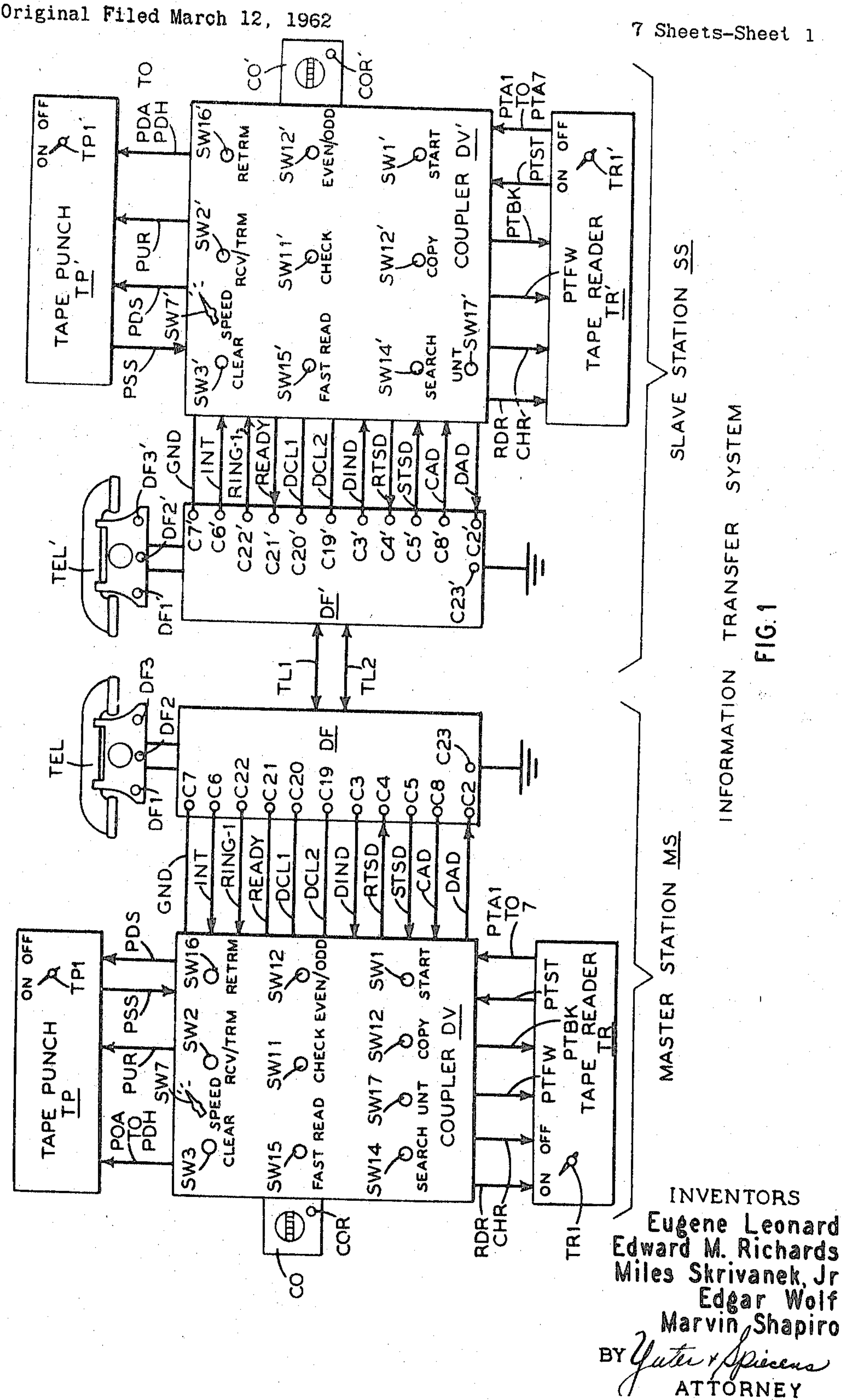
FIGURE 1 is an overall system diagram of an information transfer system in accordance with the invention.

The information, throughout the system, is represented by binary units or bits, conveniently indicated by one (1) and zero (0). In different portions of the system, the indicia representing the bits is different. For example, when the information is recorded on paper tape, a binary one is indicated by the presence of a hole and a binary zero by the absence of a hole. In the couplers, a binary one is indicated by a negative voltage, generally by minus six volts; and a binary zero is represented by the absence of a negative voltage, generally, zero volts. In the telephone line connector and over the telephone lines, a binary one is represented by a first frequency signal, generally twenty-two hundred cycles per second and a binary zero is represented by a second frequency signal, generally twelve hundred cycles per second.

The binary units are in coded combinations which are called characters. Generally, a coded combination of eight binary units represents the basic character. However, on paper tape, the characters may be represented by a seven bit combination which is transferred bits-in-parallel, characters-in-series or by a five bit combination, which is transmitted bits-in-parallel, characters-in-series. In a seven bit code, the six least significant bits represent information and the most significant bit represents parity. In a five bit code, the five bits represent information. Associated with each character on the paper tape, is a sprocket hole.

In the telephone equipment, the characters comprise coded combinations of eight bits which are transmitted serially. The six least significant bits represent a unique character; the most significant bit, which is always a binary one, is in a sense a synchronizing bit, and the second most significant bit is a parity bit. Within the couplers which connect the paper tape devices to the telephone equipment, the characters are converted between bits-in-parallel representation and bits-in-series representation. The direction of conversion will depend on the direction of character flow. If the characters are flowing from a paper tape device to the telephone equipment, the bits-in-parallel representation of the characters will be converted to a bits-in-series representation, and vice versa.

The characters are grouped into units of varying length which are called records. The records are grouped into units of variable integral numbers or records called blocks. The entire number of characters or blocks transmitted at one time will be considered as a message.

Generally, the characters will be numeric characters or numbers, alphabetic characters or letters, punctuation characters, and control characters. The coded combinations of bits representing the numbers, letters and punctuation characters may be according to any currently available codes such as Teletype code, Univac code, IBM code, etc. The control characters are unique combinations of bits which occur at particular times during the message to activate particular control operations in the couplers.

The control characters can be divided into two classes: those preceding, not associated with, the actual transmission of data (mode characters) and those incorporated in the transmitted data (format characters). The mode characters are generally transmitted at the start of transmission and in the intervals between the transmission of blocks. The format characters are generally part of the records that are transmitted. Table 1 summarizes the mode characters. It should be noted that the least significant bit is on the right and during bits-in-series transmission occurs first in time.

*Table 1*

| | |
|---|---|
| 10000000 | Reference character. |
| 10000001 | Receive information. |
| 10000010 | Transmit information at 100 c.p.s. |
| 10000100 | Transmit information at 150 c.p.s. |
| 10001000 | The output device will be punched card unit. |
| 10010000 | End of Mode. |
| 10100000 | Error. |

The role of these mode characters is hereinafter more fully described.

Table 2 summarizes the format characters which also have their least significant bits on the right and are considered to occur first in time.

*Table 2*

| | |
|---|---|
| 1P011111 | First Character FST. |
| 1P000010 | End sentinel Character ENA. |
| 1P010001 | End sentinel Character EMA. |
| 1P001001 | Ignore Character IG or IGR or IBC. |
| 1P110111 | Parity Error Character ERC or ECD. |

The bit represented by P will be a one or zero in accordance with the type of vertical parity employed.

The first character FST is always present at the start of a message. A first three-character combination of the ENA and EMA characters always precedes the first FST character at the start of a message and is always present at the end of every record to indicate the end of the record. A second three-character combination of ENA and EMA is always present at the end of a message to indicate the end of the message. The functions of the remaining characters are associated with error indications and will be discussed more fully hereinafter. A typical Message on the telephone line may take the following form:

ENA; EMA; ENA; FST; 9; 8; ERC; P; Q; ENA; EMA; ENA; P; SP1; SP2; 9; 8; . . . ; P; Q; ENA; EMA; ENA; LP; SP1; SP2; EMA; ENA; EMA.

It should be noted that the particular serial combination of characters ENA; EMA; ENA indicates the end of a record. ERC will only be present if a transverse parity has been detected in one of the characters. LP is a character indicating the vertical parity of the block. SP1 will be a space, unless an error was detected in the block and then SP1 will contain an IG character indicating that the block should be ignored. SP1 will always be a space and is provided to permit the insertion of a number indicative of the number of blocks received by the receiver during the transmission of a record if an error is detected. The serial combination of characters EMA; ENA; EMA; indicates the end of the message.

In the following set of descriptions, only the primary purpose of the signals will be discussed for the sake of clarity. In addition, only those particular units of the system that are immediately pertinent will be included in the drawings. Similarly, there will be no specific regard to the polarity of the signals and, in fact, the signal and the line carrying the signal will have the same designation.

OVERALL SYSTEM (FIGURE 1)

Referring to FIGURE 1, the information transfer system according to the invention, is shown comprising a master station MS which is connected via conventional telephone lines TL1 and TL2 to a slave station SS. Master station MS and slave station SS are identical. The master station being designated as such because the connection between the stations was established there. Master station MS comprises a transceiver DF, a coupler DV, a tape punch TP and a tape reader TR. Slave station SS comprises an identical transceiver DF′, an identical coupler DV′, an identical tape punch TP′, and an identical tape reader TR′.

The transceiver DF is a unit which includes a conventional hand set TEL with a talk button DF1, a data button DF2 and an automatic button DF3. The transceiver DF can either transmit or receive voice communications or a frequency modulated carrier which represents bits of information via the telephone lines TL1 and TL2. The transceiver DF, a standard piece of apparatus of the American Telephone and Telegraph Company, called a Dataphone, a subset 202A, is hereinafter more fully described in the Appendix. For the present description, the following is necessary:

Information in the form of serially occurring electrical pulses is transferred from the transceiver DF via the DIND signal line to the coupler DV, and at other times, information in the form of serially occurring electrical pulses is transferred via the DAD signal lines from the coupler DV to the transceiver DF. A control signal of relatively long time duration is fed from the coupler DV via the RTSD signal line to the transceiver DF. Control signals as voltages of relatively long time duration are sent from the transceiver DF via the INT, STSD and CAD signal lines to the coupler DV. The lines DCL1 and DCL2 are leads of a normally closed holding circuit in the transceiver DF which are controllably open circuited by the coupler DV. The transceiver DF when in automatic operation, i.e. with the automatic button DF3 pressed, can automatically activate the coupler DV when a ringing signal is received from the line.

The tape reader TR which is here employed to represent a typical input device is a two-speed photoelectric tape reader which can move tape either in the forward or reverse direction. Although many tape readers may be used, it is desirable to use the tape reader of the Digitronics Corporation which is hereinafter more fully described in the Appendix. For the immediate discussion it is only necessary to know that:

(a) A direct current signal on the line PTFW will move paper tape in the forward direction at a first speed;

(b) During the presence of the signal on line PTFW a direct current signal on line CHR will cause the paper tape to move at a faster speed;

(c) A direct current signal on line PTBK will move paper tape in the reverse direction at the first speed;

(d) Characters of information are transferred from the paper tape reader as a parallel combination of signals on the lines PTA1 to PTA7 to the coupler DV;

(e) A sprocket signal on the line PTST is fed in parallel with the signals on lines PTA1 to PTA7 to permit reliable sampling of the signals representing the characters by the coupler DV; and (f) It includes an on-off switch TP1 for power, with said switch being connected serially to a source of power via RDR lines.

The tape punch TP, an exemplary output device for the system, is a conventional paper tape punch such as the punch manufactured by the Teletype Corporation and is hereinafter more fully described in the Appendix. Presently, it is sufficient to know that:

(a) Periodically occurring signals on line PSS are fed from tape punch TP to the coupler DV to indicate when tape punch TP is ready to receive a character for punching;

(b) Characters are fed from coupler DV as a coded combination of parallel electrical signals on lines PDA to PDH to the tape punch TP;

(c) An electrical signal is fed from coupler DV via line PDS to tape punch TP in parallel with the signals on lines PDA to PDH to step the paper tape to the next character position; and (d) It includes an on-off switch TR1 for power with the switch being serially connected to a source of power via PUR signal lines.

The coupler DV serves as a coupling device between the transceiver DF and either the tape reader TR or the tape punch TP. When the tape reader TR serves as an input device at one of the stations, the coupler DV accepts characters whose bits are in parallel and transfers these characters with their bits in series to the transceiver DF. When the coupler DV is at a receiving station, information is received bits-in-series from the transceiver DF and transmitted with the bits of the characters in parallel to the tape punch TP. There are means included in the couplers DV and DV′ to insure that the coupler which is at the receiving station is in synchronization with the coupler at the transmitting station. Furthermore, the coupler DV generates control signals, which when received by the coupler DV′ prepares it for the transmission or reception of information. Similarly, the coupler DV′ returns control signals to prepare the coupler DV for complementary functions. In other words, the couplers DV and DV′ generate control signals which prepare them for different types of information transfer modes. In addition, the coupler DV and its mate, coupler DV′, include many error detecting and checking circuits which insure maximum reliability of information transfer and which will interrupt communication between the two stations whenever it is found that the telephone lines TL1 and TL2 are undesirable for reliable information transfer. In addition, a single coupler DV can operate in off-line operation with its associated tape punch TP and tape reader TR to edit received information and create an error free copy of the received information.

In the overall description of the information transfer system, it will be assumed that initially the power is applied to all units of both the master station MS and the slave station SS. However, the tape punches TP and TP′ and tape readers TR and TR′ are not energized. Their actual energization is hereinafter more fully described. Furthermore, it will also be assumed that the paper tape punch TP, the paper tape reader and their related units in the slave station SS, that is, the tape punch TP′ and the tape reader TR′ are completely loaded with paper tape. In addition, solely to facilitate the explanation of the system, it will be assumed that the slave station SS is to act as a transmitter whereas the master station MS is to act as a receiver. Accordingly, the switch SW2 of the coupler DV at the master station MS is placed in the receive position. It should be noted that it is equally convenient for the master station MS to act as a transmitter, that is, to send information to the slave station SS which acts as a receiver.

In addition, since the master station MS is to act as a receiver, the switch SW7 will be positioned to the particular receiving speed of the tape punch TP. That is, if the tape punch TP is capable of receiving information, say at a hundred characters per second, this switch will be accordingly placed in a position to indicate that reception will take place at a hundred characters per second. If the tape punch TP is capable of receiving at one hundred and fifty characters per second the speed switch SW7 will be accordingly placed in an appropriate position. Since there will be described a system which permits the retransmission of data by the slave station SS whenever an error in the data received by the master station MS is detected, the retransmit switches SW16 and SW16′ on both couplers DV and DV′ are thrown to the appropriate positions. In addition, since there will be checking parity of the information that is transferred, the check switches SW11 and SW11′ of both couplers DV and DV′, respectively, are activated, and since the parity must be even or odd, the switch SW12 and the switch SW12′ are placed either in the even or odd position, dependent on the parity of the information which is to be transmitted.

During attended operation, the operator at the master station depresses the talk button DF1 on the transceiver DF, raises the receiver of the associated telephone TEL and dials the telephone number of the slave station SS. He also turns on power in the tape punch TP by placing switch TP1 to the on position. When the operator at the slave station SS hears the usual ringing signal he raises the receiver TEL′ which is in the talk DF1′ position. The operator at the master station MS may give the operator at the slave station SS verbal orders indicating that if the slave station SS is to be a receiver the speed switch SW7′ is in the correct position. At this time, the operator at the master station MS will also tell the operator at the slave station SS that he should push the clear button SW3′ in the coupler DV′ as well as the counter reset COR′ button in the mechanical counter CO′. Then the operator at the slave station SS pushes the data button DF2′ on the transceiver DF′ and leaves the receiver off the cradle of the telephone TEL′. Since the slave station SS is to be the transmitter, its operator puts the switch TR1′ to the on position for the tape reader TR′. After the operator at the master station MS hears a click when the operator at the slave station SS depresses the data button DF2′, the master station's operator presses the clear push button SW3 of the coupler DV; places the receiver next to the telephone TEL and pushes data button DF2 on the telephone TEL, pushes the start switch SW1 of the coupler DV and the system proceeds completely independent of any further interference by either operator.

During unattended operation, i.e., there is no operator at the slave station SS, the initial setting up operation is simplified. At the slave station SS, it is only necessary that the automatic button DF3′ of the telephone TEL′ be depressed and that the unattended switch SW17′ be in the unattended position. At the master station MS, the conditions are the same as for attended operations.

During unattended operation, the operator at the master station MS dials the number of slave station SS. When the ringing circuit of the transceiver DF′ has received the second ring the slave station SS is energized and the ring stops. In particular, when the ringing takes place, a signal on the RING-1 signal line activates the coupler DV′. At this time, the operator at the master station MS proceeds in the same way as in attended operation.

Up until this time, both the coupler DV and the coupler DV′ are in the Idle mode. However, when the start switch SW1 is pushed, the coupler DV will enter the Bid mode and the coupler DV′ remains in the idle mode. In response to the pressing of the start button DF2, the transceiver DF sends back an interlock INT signal which causes the coupler DV to go into the Bid mode. Coupler DV then transmits a RTSD signal via the terminal C4 to the transceiver DF which in response to this "request to send signal" RTSD transmits approximately two hundred milliseconds of carrier on the telephone lines TL1 and TL2 to perform echo-suppression. Following this two hundred millisecond interval, transceiver DF transmits via the terminal C5 a "start to send" signal STSD to coupler DV. For four hundred milliseconds, coupler DV transmits reference characters via the DAD signal line to the terminal C2 of the transceiver DF. These reference characters are transmitted to the slave station SS to establish both bit synchronization and character synchronization between the coupler DV and coupler DV′. Following the reference characters, a single character is transmitted which instructs the coupler DV′ that it is to be either a transmitter or a receiver, and if it is to be a transmitter, that it should transmit at a specific rate. Table 1 above lists these characters. In the present example, coupler DV′ is to be a transmitter. At this point, a path is closed between RDR signal lines in the coupler DV′ energizing the tape reader TR′.

Following the transmission of this character, another single character, the end of mode character (see Table 1) is transmitted to the coupler DV′. When this character is generated by the coupler DV, it enters the Connect mode. When this end of mode character is received by the coupler DV′, it enters the Allow mode. In the Connect mode the coupler DV of the master station MS will act as a receiver and the coupler DV′ of the slave station SS will act as a transmitter. This is the start of a turnaround period and the coupler DV′ sends a "request to send" signal RTSD to the transceiver DF′ which then transmits approximately two hundred millisecond of carrier along the lines TL1 and TL2 to perform an echo-suppression operation. Following the two hundred milliseconds of echo-suppression, the transceiver DF′ sends a start to send signal STSD from the terminal C5′ to the coupler DV′ which transmits via the line DAD to the terminal C2′ of the transceiver DF′ approximately four hundred milliseconds of reference characters so that the coupler DV′ forces the coupler DV to come into synchronization. The four hundred milliseconds of reference characters are followed by a first control character on the line DAD which indicates whether the coupler DV is to be a transmitter or a receiver.

It should be noted that the coupler DV was initially preset to be a transmitter or a receiver. Hence, if the first control character returned does not indicate that the coupler DV is to be what it was initially set at, then the coupler DV senses a connect error for disconnecting the transceiver DF from the transceiver DF′. This is provided so that when the telephone line between the two stations is noisy or unreliable then the stations do not remain on the line and waste time and money. In such a case, the operator at the master station MS will again initiate the operation. In the case under discussion, coupler DV′ should send back a receive character.

Following the transmission of the receive character, coupler DV′ then transmits a second control character, the end of mode character. When the end of mode character is generated by the coupler DV′ it then assumes either the Transmit or the Receive mode in accordance with the previously received first control character which had instructed it in what role it should assume (for the present example, the Transmit mode). Similarly, when the end of mode character is received by the coupler DV, assuming there was no connect error, coupler DV assumes the role to which it was designated in accordance with the positioning of the receiver-transmit switch SW2. If it so happens that the master station MS is to be a transmitter, then it is again necessary to initiate a turnaround period. However, for the sake of simplicity, it has been assumed that the slave station SS is to transmit information to the master station MS. Since the coupler DV′ of the slave station SS has been transmitting, it is not necessary to go in to this turnaround period.

Coupler DV′, accordingly, sends a signal PTFW to the tape reader TR′ to start it transmitting the characters via the lines PTA1 to PTA7 along with a sprocket pulse on the line PTST, to the coupler DV′. It should be noted that if the tape reader TR′ is to transmit at one hundred characters per second, no further controls are required. However, if the tape reader TR′ is to transmit at one hundred and fifty characters per second, a signal will be fed via the CHR line to tape reader TR′. Each character is received with its bits-in-parallel, converted in coupler DV′ to a serial representation and fed via the line DAD to transceiver DF′. The character is then fed from transceiver DF′ via telephone lines TL1 and TL2 to the transceiver DF, and via the DIND signal line to coupler DV (while the transceiver DF is receiving information, it transmits a signal on the CAD line which prevents any possible spurious transmissions by coupler DV).

The character is received by coupler DV and converted into a bits-in-parallel representation. In response to sprocket pulses from tape punch TP on the line PSS, the bits of the character are transmitted as electrical signals on the lines PDA to PDH to tape punch TP. Along with the character, a signal PDS is fed to tape punch TP to step the tape one character space. (It should be noted that throughout the specification, the signal on the line and the reference number for the line are used interchangeably.)

In this manner, characters are received bits-in-parallel from tape reader TR′ via the lines PTA1 to PTA7 by the coupler DV′ and are fed bits-in-series via the line DAD to the transceiver DF′ which converts the voltage pulse representation of these bits to a shift frequency representation that are transferred via the telephone lines TL1 and TL2 to the transceiver DF, where they are reconverted to a voltage pulse representation and fed via the line DIND to the coupler DV. The coupler DV then transforms these serial bits of the character into a group of parallel bits that are fed in parallel on the lines PDA to PDH to the punch TP.

This type of transmission continues until coupler DV′ receives end of record characters (see Table 2) from the tape reader TR′ which cause tape reader TR′ to stop.

It should be noted that during the transmission of information, each of the couplers DV and DV′ also records a count of the characters transmitted and when this count reaches a particular value, circuits are alerted which when the end of record characters are sensed in both couplers DV and DV′, independently cause the start of an acknowledge mode in each station. For the sake of improved teaching, it will be assumed that this count has not been reached and therefore after the end of record characters for this record are detected, nothing further happens except that the tape reader TR′ starts and transmits the next record of information. Assume during the transmission of this second record the above-mentioned count is reached. An end of block has accordingly been reached. Therefore, at the end of this record, tape reader TR′ is again stopped. However, because the end of a block has been reached the Acknowledge mode begins.

In the Acknowledge mode, the slave station SS assumes the role of a receiver and the master station MS, that of a transmitter. Therefore, since these stations are interchanging roles, there is a turnaround cycle. In this case, coupler DV′ remains passive and coupler DV of the master station MS transmits a "request to send signal" on the RTSD line to the transceiver DF which then generates approximately two hundred milliseconds of carrier to suppress echoes on the lines TL1 and TL2. Following this two hundred millisecond period, transceiver DF then sends a "start to send signal" via the STSD line to coupler DV which begins transmitting approximately four hundred milliseconds of reference characters along the DAD line. Following these four hundred milliseconds of reference characters, coupler DV may transmit a first control character, an error character (see Table 1), if it has detected an error in the information received up to this point. It will be assumed for the present, that no error was detected. Following first control character time, a second control character, an end of mode character, is transmitted via the DAD line to transceiver DF. Coupler DV then returns to the Receive mode. When the end of mode character is received by coupler DV′ it returns to the Transmit mode. The tape reader TR′ is reenergized by the PTFW signal and the characters therefrom are transmitted as previously described.

If however coupler DV had detected an error and transmitted the error character, coupler DV would still switch to the Receive mode but coupler DV′ would enter the Retransmit mode. In particular, coupler DV′ would transmit a signal PTBK to tape reader TR′, causing it to back up to the start of the information that it has transmitted, i.e., to the start of the block. When it reaches this point, the tape reader TR′ again moves forward and coupler DV′ assumes the Transmit mode and the information is retransmitted. It should be noted that during the backing of the tape reader TR′ a turnaround period is performed.

Finally, the tape reader TR′ transmits the end of transmission characters, which when received at the coupler DV′ and the coupler DV initiate a final Acknowledge mode. At the end of this Acknowledge mode, if no error has been detected by coupler DV, coupler DV′ interrupts the internal connection of the lines DCL1′ and DCL2′ to disconnect transceiver DF′ and similarly coupler DV interrupts lines DCL1 and DCL2 of transceiver DF causing the disconnection of the stations from the telephone line. If, during this last Acknowledge mode an error had been detected by coupler DV, there would be the initiation of another Retransmit mode but provided there was no error, the above-described disconnect procedure would follow.

Incorporated in each of the couplers DV and DV′ is error-detection circuitry which permits a disconnect when a plurality of successive errors are detected. For example, if an error is detected at the end of an Acknowledge mode causing the initiation of a Retransmit mode and, after the retransmission, the following Acknowledge mode again indicates an error and this occurs four consecutive times, there will be an automatic disconnect so that the stations go off the line and stop paying toll charges for an unreliable telephone line.

Whenever the disconnect occurs, both stations revert to the Idle mode, awaiting the establishment of a new connection to the operator at the master station MS.

GENERAL DESCRIPTION OF THE BLOCKS OF THE SYSTEM

The timer TM provides the basic timing pulses for the coupler DV and comprises a strobe pulse generator which supplies the strobing pulses of four microsecond duration by which the bits of information are sampled during transmission, reception and the search-edit operations. It also includes a character bit generator which generates periodically and sequentially occurring pulses, each of four microsecond duration, which are indicative of particular bits of the characters. It further includes a synchronization detector to detect whether the timer TM of one coupler is in synchronization with the timer TM of the other coupler, and also an inhibit generator which prevents the possible erroneous sampling of information during a turnaround cycle.

The control panel CP comprises primarily a plurality of switches whose purpose is to initially set the coupler DV to particular modes of operation. Control panel CP also includes a mechanical counter which counts the number of records transmitted and received. It also prints a number on a paper tape indicative of a particular record which contains erroneous information.

The A buffer AB comprises generally seven one-bit storage units for receiving the bits of a character from one of two sources and for transmitting these bits in parallel, one character time later to the B buffer BB. The bits of the character are received serially from the transceiver DF when the coupler DV is operating as a receiver and converts these bits of the character to a paraller representation. When the coupler DV is acting as a transmitter or during the search-edit operation, the bits of the character are received in parallel from the tape reader TR and are fed one character time later in parallel to the B buffer BB.

The B buffer BB generally accepts the bits of the character in parallel from the A buffer AB and transmits these bits in parallel to either the serializer SZ or to the C buffer CB. The B buffer BB comprises seven one-bits storage units which are similar to the bits storage units of the A buffer AB, except that they include controls which regulate the times at which information may be accepted by the B buffer BB. Also included in the B buffer BB is means for detecting end sentinel characters and also a parity checker to indicate the transverse parity of the character presently contained in the B buffer BB.

The end circuitry ED receives the end sentinel characters from the B buffer BB and determines whether they occur in a particular order to indicate whether an end of a record has been reached or whether the end of transmission has been reached. It should be noted that the particular combinations of three end sentinel characters, serially following each other is unique for the end of the record, and another particular combination is unique for the end transmission. It is the function of the end circuitry ED to test for these unique combinations and give an indication whenever such a combination is detected.

The retransmit controls RT perform the function of sensing for the receipt of an error signal during the Acknowledge mode from the receiver to initiate a Retransmit mode. The retransmit controls RT then generate signals causing the paper tape of the tape reader TR, at the transmitter, to back up to the start of the record and to initiate a reversal of tape movement and a retransmission of the data of the block.

During the Receive and Transmit modes the acknowledge mode control AK counts the number of characters handled and when a predetermined count is reached, alerts circuitry to sense for the end of the block being handled. When the end of the block is reached, signals are generated which result in the initiation of the Acknowledge mode. Since the Acknowledge mode may also be initiated by the end of transmission characters, the acknowledge mode control AK also includes circuitry for sensing the occurrence of these particular end sentinel characters. At the end of an Acknowledge mode associated with the end of transmission characters, if the transmission has been error free the acknowledge mode control AK will generate a signal initiating the sequence which ends with the stations being disconnected from the telephone lines. At the end of other Acknowledge modes, during which there has been an error free transmission, the transmission of the next block begins.

The ignore and insert circuits II, generate an error character whenever a vertical parity error is detected and also generate an ignore record character whenever an error is detected in a record.

The serializer SZ has a primary function of receiving the bits of the characters from the B buffer BB in parallel and transmitting these bits in a serial manner to the transceiver DF. It also includes circuitry for generating certain control characters such as the end of mode character or the error control character which is used during the Acknowledge mode.

The function assignor FA has two main functions. It generates control signals, indicating whether the associated coupler DV is to operate as a transmitter or as a receiver. A second function is to generate, at the coupler DV or DV′ which is finishing a turnaround cycle, the time periods for the first and second control characters and to generate the signal for the second control character which is used internally within the coupler DV or DV′ to indicate the end of the mode.

The error and clear circuitry EC has the first function of recording the fact that an error has occurred and the second function to disconnect the transceiver DF from the telephone lines under certain conditions such as at the end of transmission or when the lines cause the generation of excessive errors.

The reader controls RC perform the functions of controlling the forward movement of the paper tape in the tape reader TR and to generate strobe pulses from the sprocket pulses received from the tape reader TR.

The recorder counter RK counts the records in a block during transmission so that if a retransmission is called for and the tape reversed, an indication may be given when the start of the block is reached. It also counts records in a block so that if a character is sensed which indicates that the block is to be ignored because of an error, it permits the generation of a character that represents a record count which is inserted after the ignore character so that during a search-edit operation it is known how many records to skip over.

The parity circuitry PC checks the longitudinal and vertical or transverse parity. It also accumulates the longitudinal parity count for the records. The parity circuitry PC further generates signals characteristic of the transmission time of certain suffix characters at the end of a record.

The C buffer CB accepts the bits of a character in parallel from the B buffer BB and transfers them in parallel to the tape punch TP under the control of timing signals from the tape punch TP during the Receive mode or during the search-edit operation.

The search-edit circuitry SE is used to control the deletion of characters and blocks during a search-edit operation.

THE BID AND CONNECT MODES OF THE MASTER STATION MS (FIGURE 2)

Figure 2:
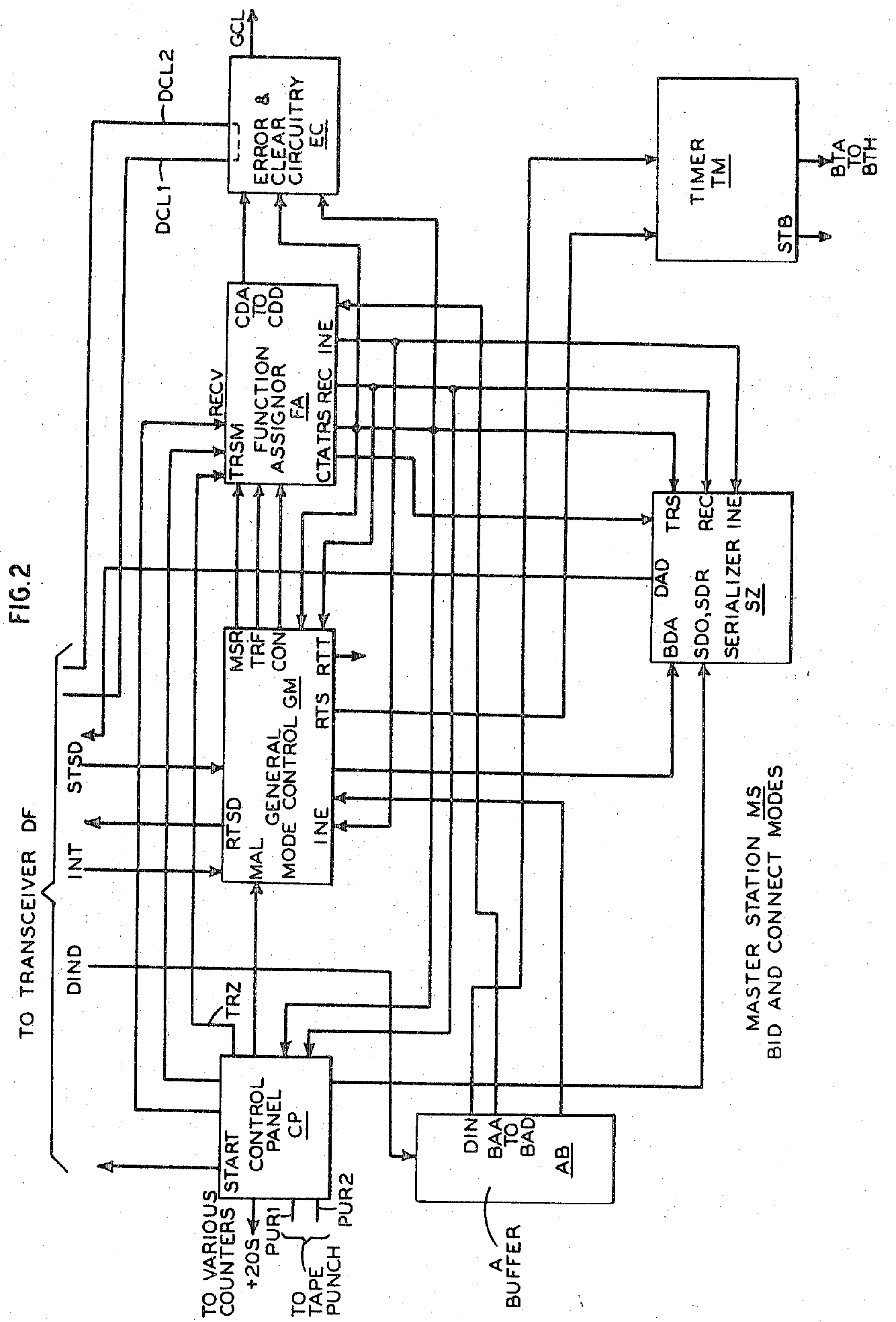
FIGURE 2 shows the flow of signals between the various units of the master station during the Bid and Connect modes.

Referring to FIGURE 2, there is shown the particular units of the system pertinent for the discussion of the Bid and Connect modes of the master station MS. Several switches on the coupler DV are initially positioned. In particular, the switch SW2 (see FIG. 1) is put in either the receive or the transmit position, depending on whether the master station MS is to act as a transmitter or as a receiver. If the master station MS is to act as a receiver, it is also necessary to position the speed switch SW7 to the receiving rate of the associated paper tape punch TP. The retransmit switch SW16 will be placed in the retransmit position if a retransmission of data received in error is desired. If parity is to be checked then switch SW11 is placed in the check position, and depending on the type of parity expected the even-odd switch SW12 is put in the appropriate position. The unattended switch SW17 is placed in the unattend position. Finally, the clear switch SW3 is actuated followed by the depression of the start switch SW1. Returning now to FIGURE 2, the actuation of the clear switch SW3 causes the generation of the +20S signal which is fed throughout the system to reset various counters and flip-flops. The start switch SW1 causes the transmission of the START signal to the transceiver DF, as previously described. Accordingly, the transceiver DF, in response, sends back an INT signal to general mode control GM to unlock the coupler DV.

At the same time, the depression of the start switch SW1 causes the generation of the MAL signal which is fed to the general mode control GM. The INT signal and the MAL signal cooperate in the general mode control GM to cause the generation of the MSR signal which is characteristic of the master station. The MSR signal is fed to the function assignor FA where it cooperates with either the TRSM or the RECV signals from the receive-transmit switch SW2 of the control panel CP. In other words, if the receive-transmit switch SW2 is in the transmit position, then a TRSM signal is received at the function assignor FA; whereas if the switch is in the receive position then the RECV signal is received at the function assignor FA. It should be noted that these two signals are mutually exclusive; only one can be present at a time. If the TRSM signal is present then the function assignor FA will start generating the TRS signal. If the RECV signal is present the function assignor will then generate the REC signal. These signals are also mutually exclusive and whichever one appears will remain until the end of transmission, to form a permanent memory for the transfer mode of the master station. That is, whether it is to be a transmitter or a receiver. In the example cited, the REC signal will be generated which cooperates with a signal from the unattended switch SW17 in control panel CP to generate a TRZ signal that is fed to function assignor FA which acts as a time interlock to prolong the generation of reference characters for a given period of time until it is certain that the tape punch TP up to speeed. The tape punch TP is energized, at the same time, by the closing of a circuit between the PUR1 and PUR2 lines. In the tape punch TP, the PUR1 line is connected to the source of power and the PUR2 line is connected to the power on-off switch TP1 which is close circuited.

Contemporary with the generation of the MSR signal and responsive to that signal, the BID and BDA signals are generated within the general mode control GM, indicating the start of the Bid mode. The occurrence of the BDA signal causes the generation within the general mode control GM of the RTS and RTSD signals in addition to the RTT signal. The RTS signal is fed to the timer TM to ensure that all timing signals generated are derived from an internal clock which is driven by a tuning fork oscillator. The RTT signal is fed to various units of the system to clear specific counters. The RTSD signal is fed to the transceiver DF to cause the generation of approximately two hundred milliseconds of carrier for echo suppression. Following a two hundred millisecond delay, the transceiver DF sends back an STSD signal to the general mode control GM causing the generation of a four hundred millisecond time interval during which a TRF signal is generated and reference characters are transmitted via the DAD signal line from the serializer SZ to the transceiver DF. At the end of the four hundred millisecond period the TRF signal disappears and in its disappearance causes the generation of a CTA signal in the function assignor FA provided the time interlock period measured by the TRZ signal is over. The CTA signal is characteristic of the period for a first control character. The first control character is primarily concerned with setting up transfer modes. That is, in particular, if the master station MS is to be a transmitter, then the transfer control character will be a character indicating that the slave station SS is to be a receiver. If the master station MS is to be a receiver, then the transfer mode character will indicate that the slave station SS is to be a transmitter and will also indicate what its transmission rate should be (see Table 1). Accordingly, the CTA signal is fed to the serializer SZ where it cooperates during the Bid mode with a BDA signal and either the TRS or REC signals to indicate whether the slave station SS is to act as a transmitter or a receiver. In addition, if the slave station SS is to be a transmitter, the CTA signal cooperates with the REC signal and either the SDO signal or the SDR signal from the speed control switch SW7 of control panel CP to indicate the transmission rate for the slave station.

After the first control character is transmitted, a second control character is generated by the function assignor FA and is characterized by the INE signal which indicates the end of a mode. The INE signal is fed to the serializer SZ for transmission to the slave station SS to cause it to leave the Idle mode and start the Allow mode. The INE signal is also fed to the general mode control GM where it causes the termination of the BID and BDA signals ending the Bid mode. It should be noted that when the BDA signal terminates, the RTS signal also terminates and the clock of the timer TM is placed in a free running mode which will be forced to follow the timing rate of signals from the slave station SS. With the termination of the Bid mode by the INE signal the Connect mode begins with the generation of the CON signal by the general mode control GM. The master station MS now waits for the turnaround cycle to be accomplished. That is, for the slave station SS to switch from a receiver to a transmitter. It should be noted that whenever the roles of the master station MS and slave station SS change, there is always this turnaround period. After approximately two hundred milliseconds, the master station MS starts receiving reference characters from the slave station SS. These reference characters are transmitted by the transceiver DF to the A buffer AB via the DIND signal line and from the A buffer AB they are transmitted as DIND signals to the timer TM. It should be recalled that the reference character is the character 10000000. These characters, when received by the timer TM, force the timer TM into bit and character synchronization with the clock of the timer TM at the slave station SS. Following the reception of four hundred milliseconds of these reference characters, a first control character, the transfer mode control character is received on the DIND signal line. This transfer mode control character should be the functional complement of the transfer mode control signal that had been sent out by the master station MS to the slave station SS. That is, if the master station MS had sent out a signal indicating that the slave station SS was a receiver, it should receive back a character indicating that the master station MS is a transmitter and should indicate the transmission rate. If the master station MS had sent out a signal indicating that the slave station SS should be a transmitter, the received control character should indicate that the master station MS is to be a receiver.

In any event, this character is fed via the BAA to BAD signal lines to the function assignor FA. The character is decoded therein, causing the generation of a combination of CDA to CDD signals. In addition, this combination of signals causes the generation of either the TRS or the REC signals. It should be noted that if the master station MS was a transmitter then the TRS signal would still be present and if there has been no error then the coded combination should also cause the regeneration of the TRS signal. Similarly for the REC signal. However, if the TRS signal had been present and the coded combination causes the generation of the REC signal then there is a conflict, for the master station then must be both a transmitter and a receiver. This indicates that there was an error in the information being transmitted between the two stations. In order to detect this error, the TRS and REC signals are fed to the error and clear circuitry EC and, if they are simultaneously present, a GCL signal is generated which initially clears the coupler DV and also causes the interruption of a circuit between the DCL1 and DCL2 signal lines which cause the disconnection of the transceiver DF from the telephone lines TL1 and TL2. The CDA to CDD signals are also fed to the error and clear circuitry EC where they are tested to determine whether there is a conflict in transmission rates and if there is such a conflict the above described connect-error is detected and the transceiver DF is disconnected from the lines TL1 and TL2.

However, if there is no such connect-error, the second control character is received on the DIND signal line. This character indicates the end of a mode and is fed as the BAE signal to the general mode control GM where it terminates the CON signal indicating the end of the Connect mode. At this instant, either the TRS or REC signal is present and the termination of the CON signal with either the REC signal or the TRS signal causes the initiation of the Receive or Transmit mode respectively. In the example cited the Receive mode is initiated.

IDLE AND ALLOW MODES OF THE SLAVE STATION SS (FIGURE 3)

At the slave station SS, the same switches are energized on the control panel CP of the coupler DV′ as has previously been described for the master station MS with the exception that the start switch SW1′ and the receive-transmit switch SW2′ are not operated, but the clear switch SW3′ is operated. The +20S signal is fed to the various counters and flip-flops throughout the system for initial clearing, and in particular, this signal when received in the general mode control GM sets the idle flip-flop causing the generation of the idle signal which is characteristic of the Idle mode. During this mode the slave station SS is completely passive and receives characters from the master station MS which is at this time in the Bid mode. In particular, the reference characters transmitted at the beginning of the Bid mode of the master station MS are received from the transceiver DF′ via the DIND signal line by the A buffer AB and then transferred via the DIN signal line to the timer TM to constrain timer TM to operate in bit and character synchronization with the timer TM of the coupler DV at the master station MS.

Following the reference characters, a first control character is received. This first control character is the transfer mode character. The character is transferred via the DIND signal line to the A buffer AB where it is converted to a parallel combination of BAA to BAD signals which are fed to the function assignor FA where they cooperate with the idle signal to generate a coded combination of CDA to CDD signals which indicate whether the slave station SS is to be a transmitter or a receiver. If the coded combination indicates that the slave station SS is to be a transmitter, for the cited example, then the TRS signal is generated. The TRS signal is fed to the control panel CP where it cooperates with a signal generated by the unattended switch SW17 to generate a TRO signal that is fed to function assignor FA to provide a time interlock until it is certain that the tape reader TR′ is energized. At the same time, the TRS signal and the signal from switch SW17 close a circuit between the RDR1 and RDR2 lines to energize tape reader TR. The end of line RDR1 in tape reader TR′ is connected to the source of power, the end of line RDR2 in tape reader TR is connected to switch TP1′ which is close circuited. If however, the slave station SS is to be a receiver, then the coded combination will cause the generation of the REC signal. The CDA to CDD signals are also fed to the error and clear circuitry EC which detects for certain disallowed combinations, which if present, indicate an error in the reception of the information and the disconnect procedure as described with respect to FIGURE 2 takes over.

If however, no such error condition is detected, the second control character is received to indicate the end of the mode. This character is transmitted as a BAE signal to the general mode control GM where it causes the resetting of the idle flip-flop causing the termination of the IDLE signal and the setting of the allow flip-flop causing the generation of the ALL signal which in turn causes the generation of the BDA signal. The BDA signal performs substantially the same role it performed in the description of FIGURE 2. That is, it causes: the generation of the RTT signal which resets certain counters and flip-flops throughout the system; the generation of the RTS signal which is fed to the timer TM so that the timer now becomes under the control of an internal tuning fork oscillator; and the RTSD signal which initiates the turnaround cycle. The RTSD signal is fed to the transceiver DF′ which now transmits approximately two hundred milliseconds of carrier and then sends an STSD signal to the general mode control GM causing the regeneration of the TRF signal which lasts for four hundred milliseconds during which time reference characters are transmitted from the serializer SZ via the DAD signal line to the transceiver DF′ for transmission to the master station MS for forcing the coupler DV at the master station MS to fall into synchronization with the timer TM of the slave station SS. At the end of this four hundred millisecond period the TRF signal terminates, causing the generation of the CTA signal which is indicative of the first control character, provided the time interval established by the TRO signal is over. This first control character is associated with a transfer mode character and should be the complement of the transfer mode character received by the slave station SS. That is, if the slave station SS was to be a transmitter, then at this time it will send back a signal to the master station MS, indicating that it should be a receiver and vice versa. Accordingly, the CTA signal cooperates with the BDA and either the TRS or REC signals in the serializer SZ to transfer the transfer mode character via the DAD signal line to the transceiver DF′. For the example cited the TRS signal will be present.

Following the transmission of the first control character, the INE signal, representative of the second control character which indicates the end of a mode, is transmitted to the serializer SZ for transmission to the master station MS to cause it to terminate the Connect mode. The INE signal is also fed to the general mode control GM to terminate the Allow mode by the resetting of the allow flip-flop. The resetting of the allow flip-flop in cooperating with either the TRS or REC signal (these being mutually exclusive) initiates either the Transmit mode or the Receive mode for the slave station SS. For the example cited, the Transmit mode will be initiated.

Figure 4:
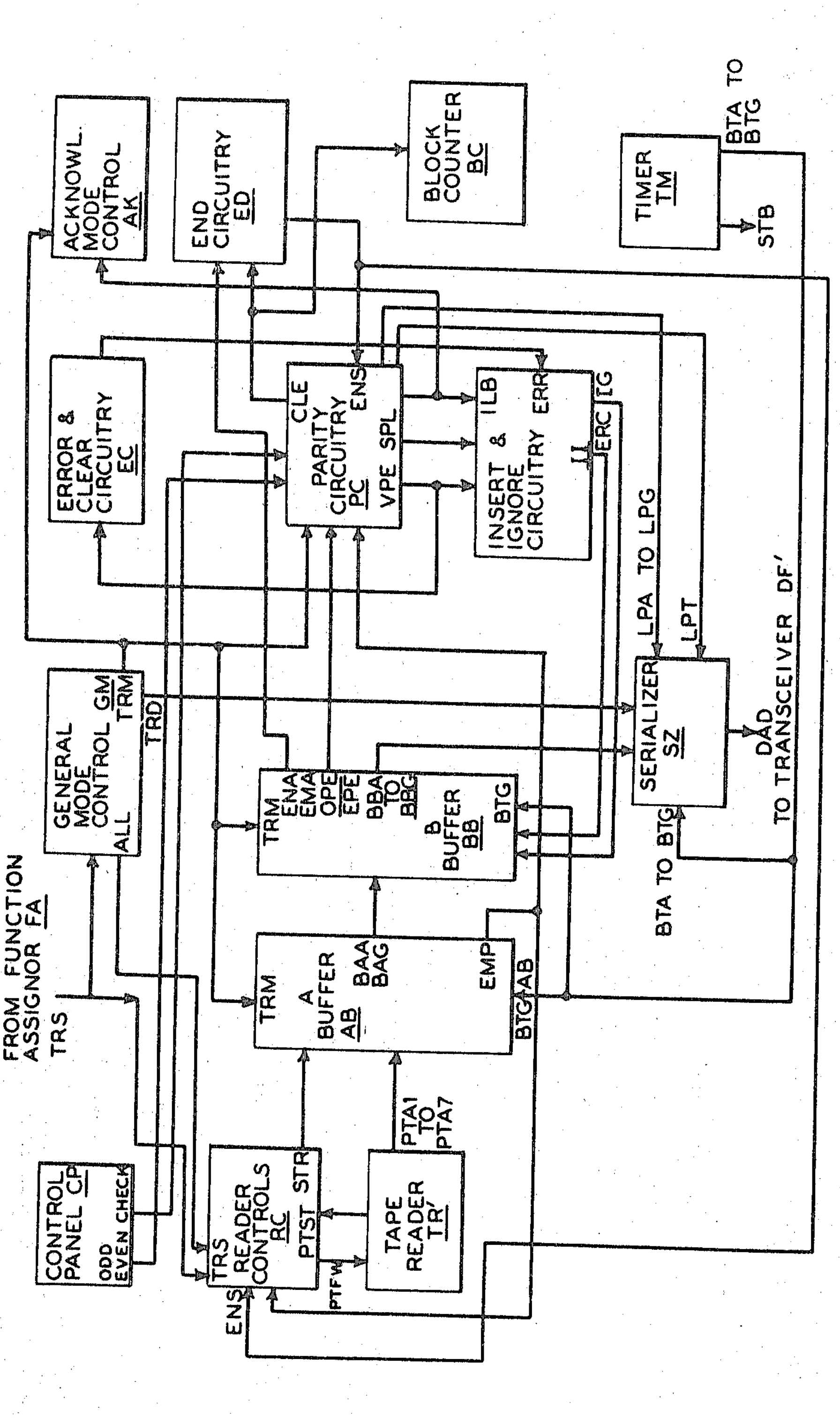
FIGURES 4 and 5 show, for the Transmit mode, signal flow between the units involved.

TRANSMITTER: TRANSMIT MODE; PARITY CHECK INSERTION OF IGNORE CHARACTERS, AND END OF BLOCK DETECTION (FIGURE 4)

Once the Connect mode at the master station MS and the Allow mode at the slave station SS terminate, the stations are essentially identical except that one of the stations enters the Transmit mode and the other station the Receive mode. FIGURE 4 shows the slave station SS in the Transmit mode. It should be recalled that whichever station was to be the transmitter, ended its previous mode with the function assignor FA still generating the signal TRS. In addition, it should be recalled that when the master station MS and the slave station SS were initially set up, several switches on the control panel CP were thrown to particular positions. Some of these switches have been described in the previous sections. In this section it is necessary to take into account two more of these switches; namely, the odd-even switch SW12 and the check switch SW11 (see FIG. 1). The odd-even switch SW12 indicates whether the system will check for odd or even parity. The check switch SW11 indicates that there will be a parity check. With the check switch SW11 thrown, a CHECK signal is fed to the parity circuit PC and depending on the position of the odd-even switch SW12, an odd or an even signal will also be sent to the parity circuit PC.

Since it has been assumed that the slave station SS is to be the transmitter, it is not necessary to enter a turnaround cycle and slave station SS can immediately start transmitting data to master station MS. In fact, when the Allow mode ended, the termination of the ALL signal in the general mode control GM, where it cooperates with the TRS signal, causes the generation of the TRM signal that is characteristic of the transmit mode. Also, the termination of the ALL signal cooperates with the TRS signal in the reader controls RC to generate the PTFW signal which starts the paper tape of the tape reader TR′ moving in the forward direction. The TRM signal, at the same time, is fed to the acknowledge mode control AK to alert it to counting characters. The TRM signal is also fed to the parity circuit PC to alert it for the detection of the parity of characters to be transmitted. The TRM signal is fed to the A and B buffers AB and BB to permit them to receive information. Simultaneous with the generation of the TRM signal is the generation of the TRD signal which is fed to the serializer SZ to open up its gates to permit the transmission of data from the B buffer BB to the transceiver DF′.

As the paper tape in the tape reader TR′ reads a character, a sprocket pulse PTST is fed to the reader controls RC as the bits of the character being read are sent in parallel via the PTA1 to PTA7 signal lines to the A buffer AB. In response to the PTST signal, reader controls RC transmits a strobing pulse STR to the A buffer AB and the bits of the character are temporarily stored in parallel in a plurality of flip-flops. The A buffer AB is a seven bit register comprising seven flip-flops. Whenever the A buffer AB contains information, a —EMP signal is fed back to the reader controls RC to interrupt if necessary the PTFW signal so that the tape reader TR′ will not transmit another character until the A buffer AB transfers the character it is holding to the B buffer BB. This transfer occurs through the aid of a timing signal BTH which occurs once per character time from the timer TM and is fed to the A buffer AB. This timing signal resets all the flip-flops in the A buffer AB and by virtue of the resetting, transmits the bits of the character as BAA to BAG signals to the B buffer BB. When the bits of the character enter the B buffer BB, they are fed via the BBA to BBG signal lines to the serializer SZ, where they are sequentially sampled by the BTA to BTG signals from the timer TM. These signals occur sequentially so that it is possible to take the information received in parallel from the B buffer BB and transmit it in serial form on the DAD signal line to the transceiver DF′.

While the character is still in the B buffer BB, an odd and even transverse or vertical parity test is performed and depending on the outcome of the test, that is, whether the parity of the character is odd or even, either an OPE or an EPE signal is fed to the parity circuit PC. At the time of the transfer from the A buffer AB to the B buffer BB, the A buffer AB will be momentarily empty and an EMP signal is also fed to the parity circuit PC. The EMP signal generates an SPL signal which is used to test the vertical or transverse parity of the character in the B buffer BB as indicated by either the OPE or EPE signals. If the parity is incorrect, a VPE signal is fed to the error and clear circuitry EC to generate an error signal which is fed as the signal ERR to the insert and ignore circuitry II. At the same time, the VPE signal and the SPL signal cooperate in the insert and ignore circuitry II to generate an ERC signal which is fed to the B buffer BB to force set this buffer to an ignore character which replaces the character then stored, causing the ignore character to be serialized and fed to the transceiver DF′.

It should be noted that the SPL signal is generated for every character transferred from the A buffer AB to the B buffer BB and this SPL signal is fed to the acknowledge mode control AK where a count is kept of the characters transmitted. The purpose of this count will hereinafter be fully described.

Characters are transmitted in this manner until finally the B buffer BB receives the end of record characters. These will be three characters occurring sequentially and having particular coded combinations as is indicated by the ENA and EMA signals which are fed to the end circuitry ED. More particularly, the B buffer BB detects these characters and generates the above-mentioned signals. When these signal are received in a pre-arranged sequence the end circuitry ED generates an ENS signal which is fed to the reader controls RC to stop the tape reader TR′ by temporarily discontinuing the PTFW signal.

The ENS signal is fed to the parity circuitry PC where it causes the generation of an LPT signal which lasts one character time and is an indication of the time to transfer the longitudinal parity character. The LPT signal is fed to the serializer SZ where it cooperates with the LPA to LPG signals from the parity circuitry PC to generate the longitudinal parity character, which is then transmitted via the DAD signal line to the transceiver DF′. Following this character time, an SPC character time is generated in the parity circuitry PC followed one character time later by the ILB character time. The ILB signal is fed to the insert and ignore circuitry II where it cooperates with an ERR signal from the error and clear circuitry EC which will be present if an error had been detected anywhere during the transmission of the record to cause the generation of an IG signal which is fed to the B buffer BB to force the flip-flops into states which indicate a special character to be interpreted as meaning "ignore the last record." This special character is fed from the B buffer BB in the usual manner to the serializer SZ for transmission via the DAD signal line to the transceiver DF′. One character time later, the ILB signal disappears and is followed by an LPL signal within the parity circuit PC, which causes the generation of a CLE signal that is fed to the end circuitry ED, causing the termination of the ENS signal. When the ENS signal terminates, the reader controls RC again generate the PTFW signal causing the tape reader TR′ to again start transferring information to the A buffer AB. This process continues until another set of end of record characters, or a set of end of transmission characters is detected.

TRANSMITTER: ACKNOWLEDGE MODE, RETRANSMIT MODE AND DISCONNECT (FIGURE 5)

During the course of the interchange of information between the master station MS and the slave station SS, it is necessary periodically to halt the transmission of data from the transmitter to the receiver in order that a check may be performed concerning reliability of the information that has been transferred. The stated periods of time are measured primarily by a fixed number of characters that have been transferred. During each transmission period a count is kept of the number of characters transferred and when this count is reached, it is temporarily stored awaiting the detection of an end of record. When the end of the record is reached, after the desired count of characters has been attained, an Acknowledge mode is instituted. At the start of the Acknowledge mode there is a turnaround in the stations. That is, the transmitting station becomes a receiver and the receiving station a transmitter. If during the course of the previous transmission, the receiving station detected an error in the received information, it will transmit an error character to the transmitter during the Acknowledge mode. Upon receipt of the error character, the transmitter will enter a Retransmit mode which is hereinafter described. The Acknowledge mode may also be entered in a second way. That is, when the end of transmission characters are sensed, regardless of the character count, signals will be generated which also initiate the Acknowledge mode.

When the transmitter receives the error character from the receiver and the Acknowledge mode ends, the Retransmit mode begins. During the Retransmit mode, the tape reader TR′ of the transmitter is backed up to the beginning of the information it started transmitting at the beginning of the Transmit mode, then stopped, and started in the forward direction and the previously transmitted information is again transmitted followed by another Acknowledge mode. If an error character is again transmitted, there will be another Retransmit mode. If, however, no error character is received by the transmitter, one of two situations occur. If the Acknowledge mode was instituted by virtue of the counting of the characters the transmitter will then start transmitting the next block of records recorded on the tape reader TR′. However, if the Acknowledge mode was initiated by the end of transmission signals recorded on the tape reader TR′, a disconnection operation will occur in which the transceiver DF′ is disconnected from the telephone lines TL1 and TL2 and all communication between the master station MS and the slave station SS ceases.

Figure 5:
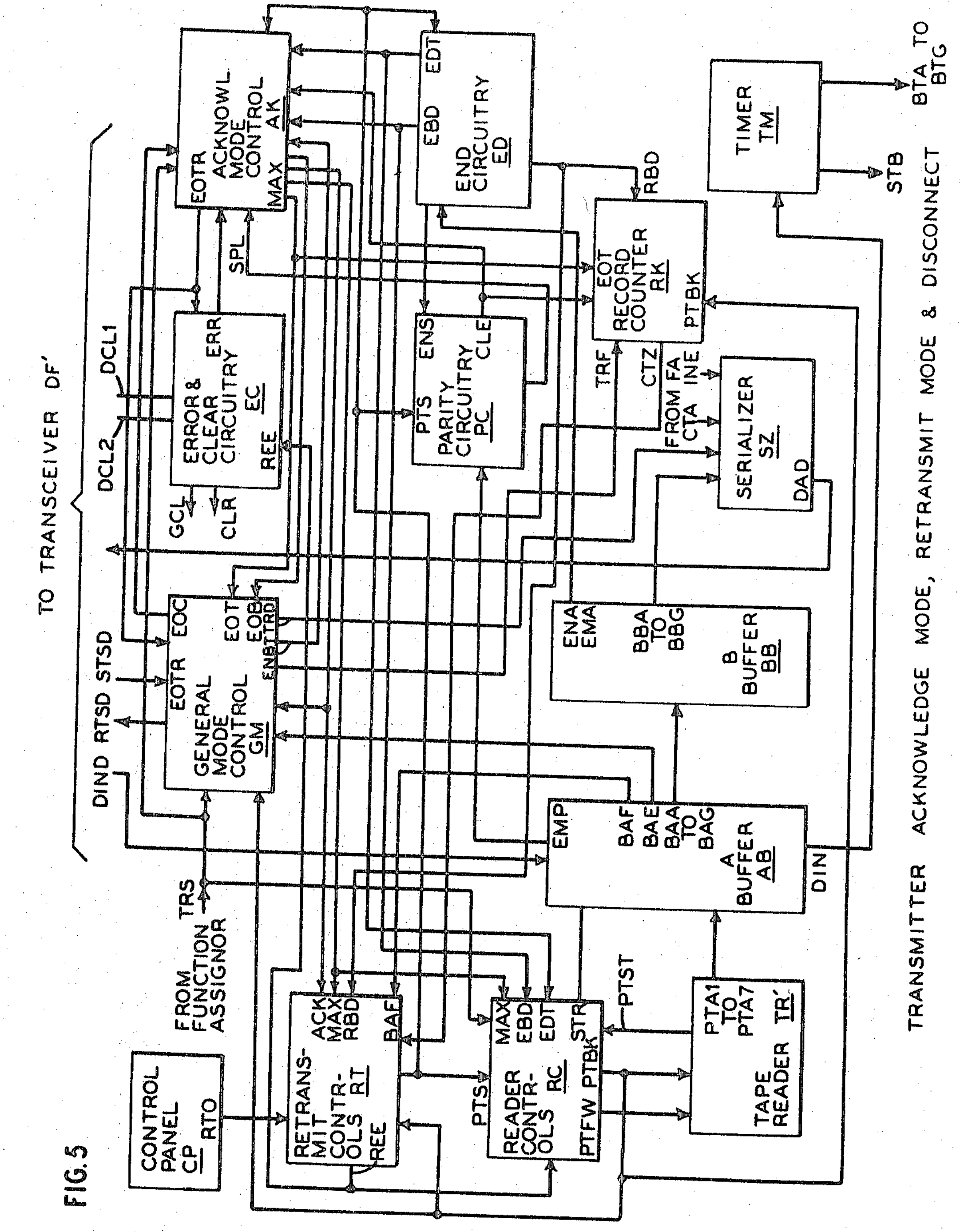

The Acknowledge mode, the Retransmit mode and the Disconnect at the transmitter will be described chiefly with reference to FIGURE 5 which should be considered as a continuation of FIGURE 4 and in a sense a superposition thereon solely for the sake of clarity, so that the number of interconnections does not obscure the teaching of the operation. It will be recalled that, during the discussion of FIGURE 4, characters were fed from the tape reader TR′ via the PTA1 to PTA7 signal lines to the A buffer AB and via the BAA to BAG signal lines to the B buffer BB. Whenever a character was transferred from the A buffer AB to the B buffer BB for transmission, an EMP signal was generated which was fed to the parity circuit PC causing the generation of an SPL pulse. The SPL pulses are fed to the acknowledge control AK where they are counted. In other words, there is one SPL pulse for each character transmitted. The acknowledge mode control AK counts these SPL pulses and when a predetermined count is reached a MAX signal is generated which is fed to the retransmit controls RT where it performs no function at this time. It is also fed to the reader controls RC to alert control circuitry therein.

It will further be recalled that the B buffer BB senses for the end of record characters and when they are detected, ENA and EMA signals are transmitted to the end circuitry ED. When the particular combination of ENA and EMA signals is detected in the end circuitry ED, and EBD signal is generated which is fed to the reader controls RC where it cooperates with MAX signal present there to halt the tape reader TR′ by terminating the PTFW signal. At the same time the EBD signal is generated, the end circuitry ED generates an ENS signal which is fed to the parity circuit PC casing the LPT, SPC, ILB, LPL signal cycle, as described with respect to FIGURE 4, and finally generating the CLE signal which is fed to the acknowledge mode control AK where it cooperates with EBD signal and the MAX signal causing the generation of an EOB signal. The EOB signal is fed to the general mode control GM where it terminates the TRM signal and the TRD signal, ending the Transmit mode. With the disappearance of the TRD signal, the paths between the B buffer BB and the output of the serializer SZ are opened and no further signals via the DAD signal lines may be transmitted to the transceiver DF′. The general mode control GM, at the same time, generates an ENBT signal which is fed to the acknowledge mode control AK to set the acknowledge flip-flop therein, causing the generation of the ACK signal and the start of the Acknowledge mode.

The Acknowledge mode may be entered in a second way; that is, by the detection of the end of transmission characters from the paper tape on the Tape Reader TR′. When these characters are detected in the B buffer BB, a different combination of ENA and EMA signals are fed to the end circuitry ED, causing the generation again of an ENS signal which performs the above-described function, and the generation of an EDT signal which is fed to the reader controls RC to terminate the generation of the PTFW signal, halting the tape reader TR′. The EDT signal also is fed to the acknowledge mode control AK where it causes the generation of the EOT signal which is fed to the general mode control GM where it performs the same function as the EOB signal, that is, ending the Transmit mode and causing the generation of the ENBT signal which is fed back to the acknowledge mode control AK, causing the setting of the acknowledge flip-flop and the generation of the ACK signal.

The Acknowledge mode is characterized by the setting of the acknowledge flip-flop in the acknowledge mode control AK, causing the generation of the ACK signal which is fed to the general mode control GM where it performs no function at this time, and to the retransmit controls RT to sensitize it for the detection of an error character. During the Acknowledge mode the transmitter is basically a passive receiver and first starts receiving reference characters from the receiver, now acting as a transmitter, via the transceiver DF′ and the DIND signal line to the A buffer AB which transmits them as DIN signals to the timer TM to force the timer TM to follow the clock rate or come into synchronization with the receiver. After the reference characters are received, a first control character is received over the DIND signal lines. If this first control character is an error character indicating that the receiver had received erroneous information during the previous information transfer mode, a BAF signal is fed to the retransmit controls RT where it cooperates with the ACK signal to generate the REE signal which will initiate a Retransmit mode, following the end of the Acknowledge mode.

After the first control character is received, a second control character is received, that is the end of mode character. This end of mode character is transmitted as a BAE signal to the general mode control GM, which in response, generates the EOC signal, characteristic of the end of a mode at the transmitter. The EOC signal is fed to the acknowledge mode control AK, where it cooperates with the TRS signal to reset the acknowledge flip-flop, causing the termination of the ACK signal and ending the Acknowledge mode. The termination of the ACK signal at the general mode control GM causes the generation of the TRM, RTS and RTSD signals, which initiate another turnaround cycle. The transceiver DF′ transmits two hundred milliseconds of carrier and then returns an STSD signal to the general mode control GM and the transmitter than transmits four hundred milliseconds of reference characters to the transceiver DF′ for transmission to the receiver. This is followed by the usual control characters and the transmitter would be in a condition for transmitting information, unless the Acknowledge mode had been initiated by the end of transmission characters. However, it was assumed that an error character was received, causing the generation of the REE signal in the retransmit controls RT. The REE signal is fed to reader controls RC causing the generation of the PTBK signal, indicating the start of the Retransmit mode.

It should be noted that during the turnaround cycle at the transmitter, when the reference characters are being transmitted, a TRF signal is fed to the record counter RK to clear the count in this counter to zero only if no retransmission is necessary. If a retranmission is necessary the record count decreases by one each time an end sentinel is read in reverse. It should be further noted that the CLE signal which is generated at the end of each record that is read, is also fed to the record counter RK to increase its count by one. This occurs for all records except the record during which the MAX signal is generated. More specifically, the MAX signal, when generated, is fed to the record counter RK to inhibit it from counting the next CLE signal that is generated.

The retransmit mode is characterized by the presence of the PTBK signal which is generated by the reader controls RC. The PTBK signal is fed: to tape reader TR' causing it to read in the reverse direction, that is, to back up; to the retransmit controls RT to alert end of record circuitry, which will hereinafter be fully described; to the general mode control GM to cause the TRD signal to change polarity so that no information may be transferred from the serializer SZ at this time; and to the record counter RK to cause it to act as a unit subtracter instead of a unit adder. The paper tape is now moving in the reverse direction and characters are read via the PTA1 to PTA7 signal lines through the A buffer AB to the B buffer BB. However, as above described, they are not transmitted by the serializer SZ. This transfer of characters continues until the B buffer BB decodes the end of record characters, which is characterized by the ENA and EMA signals which are fed to the end circuitry ED. When the unique combination of these signals is detected therein, an RBD signal is generated. The RBD signal is fed to the record counter RK and one is subtracted from the count therein. If the counter has not reached zero, the reverse reading of the tape continues for the next record. Assume that an RBD finally causes the count therein to reach zero. This will be indicated by the generation of the CTZ signal which is fed to the retransmit controls RT, to indicate that the reading, the first record that had been previously transmitted, is being performed. When the end of this first record is reached, the usual RBD signal is generated and is fed to the retransmit controls RT. In a retransmit controls RT the simultaneous occurrence of the PTBK signal, the CTZ signal and the RBR signal indicate that the start of the block is reached and a PTS signal is generated, indicating the termination of the Retransmit mode. The PTS signal is fed to the reader controls RC, terminating the PTBK signal and regenerating the PTFW signal which will start the tape reader TR' in the forward direction. The PTS signal is also fed to the parity circuitry PC to clear parity counters preparatory to maintaining a parity count of the the characters that will be transmitted. The PTS signal is also fed to the knowledge mode controls AK to clear the character counter to zero, preparatory to counting the characters that will now be transmitted; and to the end circuitry ED to clear the circuits therein which caused the generation of the RBD signal. Finally, the disappearance of the PTBK signal in the general mode control GM, permits the TRD signal to open gates within the serializer SZ so that the contents of the B buffer BB, during transmission, may be fed via the serializer SZ and the DAD signal line to the transceiver DF' as during a normal transmission. After this message has been retransmitted, there is another Acknowledge mode. It will be assumed that the receiver did not receive an error and therefore the REE signal is not generated. It will further be assumed that the end characters that initiated the Acknowledge mode were the end of transmission characters instead of the end of record characters along with the MAX signal.

Since there was no error, the REE signal was not generated and therefore no ERR signal is fed from the error and clear circuitry EC to the acknowledge mode control AK. Consequently, the EOC signal from the general mode control GM cooperates within the acknowledge mode control AK with the TRS signal from the function assignor FA to cause the generation of an EOTR signal which is fed to the general mode control GM to set the Idle flip-flop therein, causing the generation of the IDLE signal which is characteristic of the Idle mode. At the same time, the EOTR signal is fed to the error and clear circuitry EC, causing the generation of the GCL and CLR signals that are fed throughout the system to clear flip-flops and counters. The connection between the DCL2 and DCL1 signal lines to the transceiver DF' are open. The opening of these lines causes the transceiver DF' to disconnect from the telephone lines TL1 and TL2. Thus the slave station SS is returned to the Idle condition with the transceiver DF' disconnected from the telephone lines TL1 and TL2.

Figure 6:
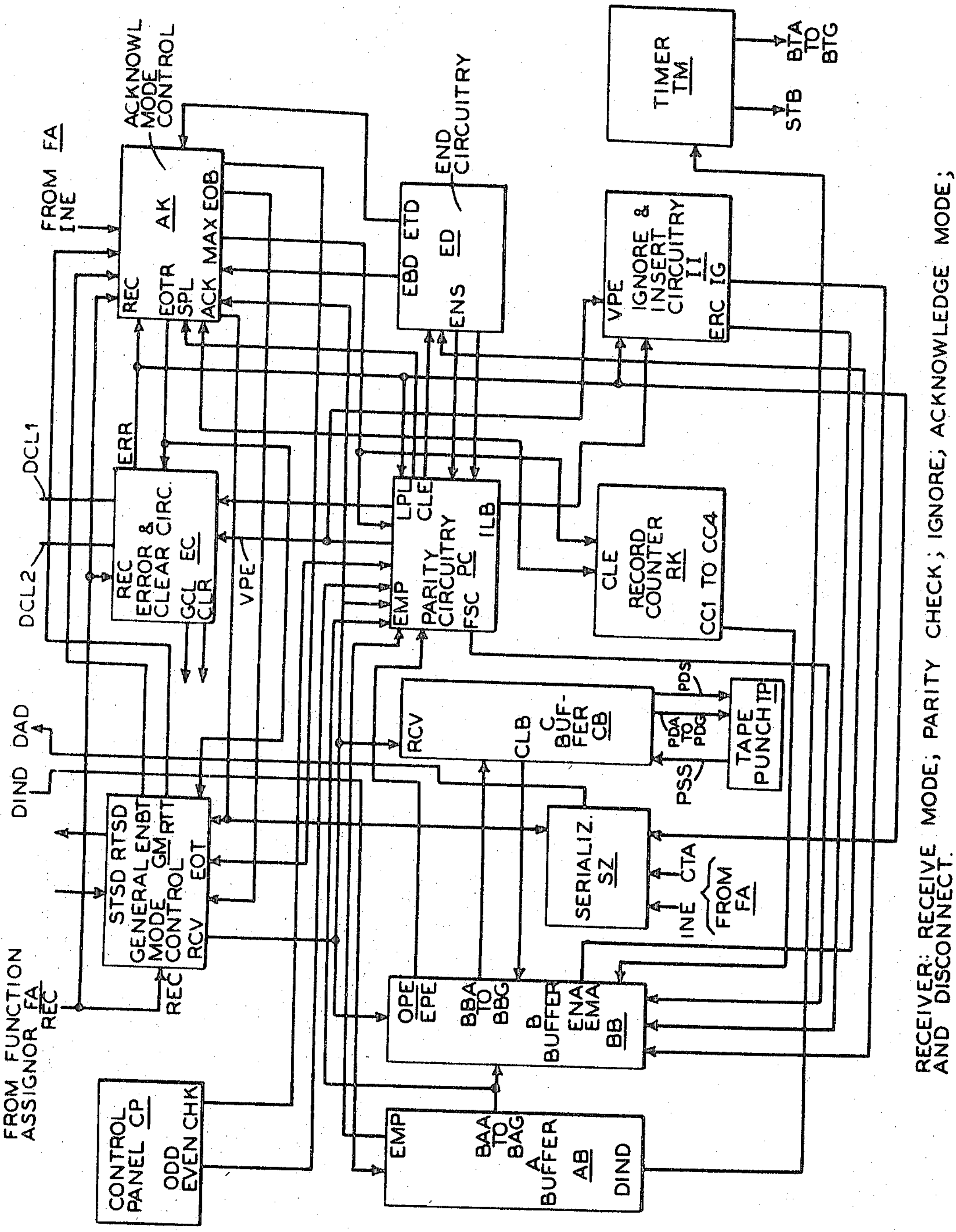
FIGURE 6 is a signal flow diagram between the various elements of the receiver.
Figure 7:
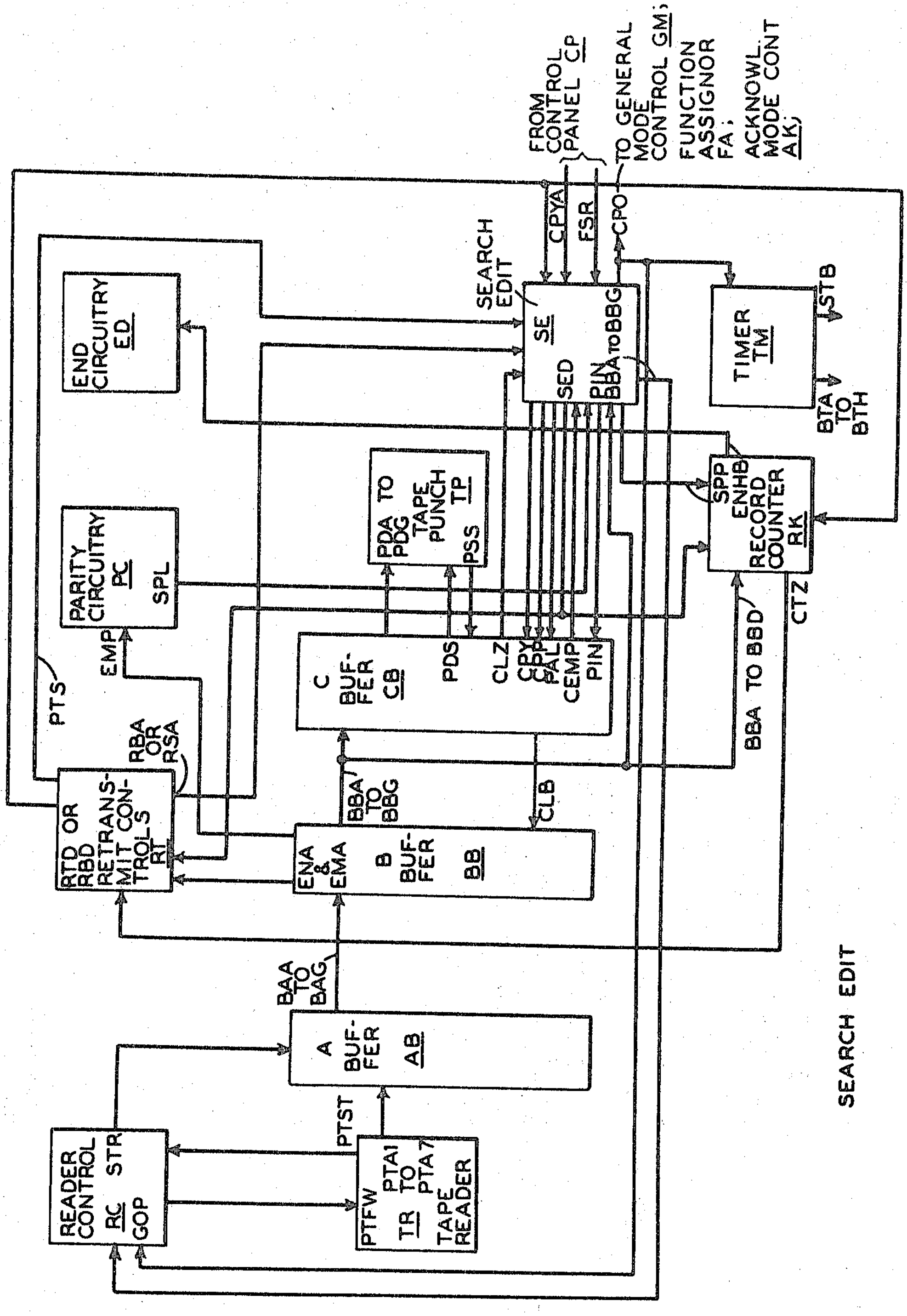
FIGURE 7 shows the signal flow during the Search-Edit mode.

RECEIVER: RECEIVE MODE; PARITY CHECK; IGNORE; ACKNOWLEDGE MODE; AND DISCONNECT (FIGURE 6)

Since there will always be a check of parity at the receiver, the control panel CP transmits either an ODD or an EVEN signal to the parity circuitry PC. This signal will agree with the parity that is to be checked and will be the same as the parity being checked at the transmitter. Control panel CP also transmits the CHK signal to the parity circuitry PC to indicate that a parity check is to be performed.

It will be recalled that, at the end of the Connect and Bid modes, it was assumed that the slave station SS would be the transmitter and the master station MS the receiver. Therefore, at the master station MS the function assignor FA is still transmitting the REC signal. The REC signal is fed to the error and clear circuitry EC to alert error and clearing circuits therein. The REC signal is also fed to the acknowledge mode control AK to alert circuitry therein for use at the end of the Acknowledge mode as hereinafter described. Finally, the REC signal is fed to the general mode control GM. At the end of the above-described Connect mode at the master station MS, the CON signal, characteristic of that mode, terminates. The termination of the CON signal cooperating with the REC signal in the general mode control GM causes the generation of the RCV signal which is characteristic of the Receive mode. The RCV signal is fed: to the B buffer BB to permit it to receive information from the A buffer AB; to the C buffer CB to permit the transfer information to the tape punch TP; to the parity circuitry PC to alert the vertical and longitudinal parity checkers therein; and to the acknowledge mode control AK to alert the character counter therein which is used to generate the Acknowledge mode in the same manner as described for the transmitter. It will be recalled that the timer TM is constrained into synchronization with the timer of the transmitter by virtue of the DIND signals received by the A buffer AB and fed therefrom as DIND signals to the timer TM.

In addition, the characters from the transmitter are received at the transceiver DF and fed serially by bit into the A buffer AB, where they are sequentially sampled by BTA to BTG signals, causing the generation of a combination of BAA to BAG signals that are fed in parallel to the B buffer BB. In particular, a character is serially loaded into the A buffer AB and during the occurrence of the BTH signal the A buffer AB is cleared, causing the transmission of BAA to BAG signals to the B buffer BB. During the entire time of the reception of characters, the tape punch TP periodically transfers PSS signals to the C buffer CB. Each PSS signal, when received by the C buffer CB, causes the transfer of the contents of the C buffer CB via the PDA to PDG signal lines to the tape punch TP for punching. Simultaneous with this transfer, a PDS signal is also fed to the tape punch TP to step the paper tape to the next position. The PSS signal in the C buffer CB then generates a CLC signal therein which clears the C buffer CB and also causes the generation of a CLB signal which is fed to the B buffer BB to clear the B buffer BB and in the course of clearing causes the transfer of the contents of the B buffer BB via the BBA to BBG signal lines to the C buffer CB. To summarize, signal flow is as follows: the characters are received bit serially by the A buffer AB where they are converted to a plurality of parallel bits, via the B buffer BB and C buffer CB in parallel to the tape punch TP.

It should be noted that each time the A buffer AB is emptied during the transfer to the B buffer BB, and EMP signal is fed to the parity circuitry PC, which in response to this EMP signal, generates a sample pulse SPL therein which is used to check parity and also transmits this sample pulse via the SPL signal line to the acknowledge mode control AK where it is unit added to the count of the characters already received.

Each character as it enters the B buffer BB is checked to determine whether it is of even or odd, vertical or transverse, parity. Depending on the vertical parity, either an OPE or an EPE signal is fed to the parity circuitry PC. This signal cooperates with either the ODD or the EVEN signal from the control panel CP and also the internally generated SPL signal, to indicate whether there is a vertical parity error in the same way as described for the transmitter. If there is a vertical parity error, the VPE signal is fed to the error and clear circuitry EC, causing the generation of an ERR signal. The VPE signal is also fed to the ignore and insert circuitry II, causing the generation of an ERC signal which is fed to the B buffer BB forcing the flip-flops therein to register an ignore character which overrides the character stored therein so that the ignore character is then fed to the C buffer CB instead of the character having the vertical parity error.

Characters are transferred in this manner and finally the end of block characters are received and detected in the B buffer BB causing the generation of a combination of ENA and EMA signals which are fed to the end circuitry ED. When the predetermined combination of these ENA and EMA signals are detected in the end circuitry ED, there is generated an EBD signal which is fed to the acknowledge mode control AK and its function there will be hereinafter described. Simultaneously, an ENS signal is generated which is fed to the parity circuitry PC.

The ENS signal, when received by the parity circuitry PC, causes the generation of an LPT signal which lasts one character time and indicates that a longitudinal parity test is to be performed. It should be noted that during the reception of the characters, the bits of the characters are counted in parallel by the parity circuitry PC by virtue of the BAA to BAG signals that are fed from the A buffer AB. The last character received by the A buffer AB at longitudinal parity test time, is the longitudinal parity character received from the transmitter. Therefore, if there is no longitudinal parity error, the count registered in the parity circuitry PC, when added to the longitudinal parity character just received, should cause all the counters therein to assume a "zero" state. Any other condition indicates that there is a longitudinal parity error. If such an error exists, the parity circuitry PC transmits an LPR signal to the error and clear circuitry EC, which will cause the generation of an ERR signal. During the next character time the LPT signal disappears, causing the generation of an SPC signal in the parity circuitry PC, whose function is hereinafter more fully described. During the next character time, the SPC signal disappears, causing the generation of the ILB signal by the parity circuitry PC. If an error had been registered, the ERR signal will still be present and it cooperates in the ignore and insert circuitry II with the ILB signal received from the parity circuitry PC to cause the generation of an ignore character signal IG, which is fed to the B buffer BB, causing the generation therein of a special character indicating "Ignore Last Block." This character is then transmitted in the usual manner via the C buffer CB to the tape punch TP. During the next character time the ILB signal disappears, causing the generation of the LPL signal which clears the longitudinal parity counters in the parity circuitry PC and causes the generation of a CLE signal which is transmitted to the end circuitry ED to clear the circuits that registered the EBD signal and is also fed to the record counter RK to indicate that one record has been received.

The next record starts being received. It will be assumed that during this record the predetermined count of the character counter in the acknowledge mode control AK is reached. When this count is reached, a MAX signal is generated. The MAX signal within the acknowledge mode control AK prevents further counting of characters and also alerts circuitry to detect the next EBD signal which occurs. The MAX signal is also fed to the parity circuitry PC and its function there is hereinafter more fully described. Finally, the MAX signal is fed to the record counter RK to prevent any further counting of records. Character reception continues, in the usual manner, until the end of record signals are again detected causing the generation of the EBD and ENS signals as described above. The ENS signal, when received by the parity circuitry PC, causes the generation of the LPT signal therein and the above described parity test is performed. During the next character the LPT signal goes off, causing the generation of the SPC signal and if an error has been detected the SPC signal cooperating with the ERR signal in the parity circuitry PC, causes the generation of an FSC signal which is fed to the B buffer BB, forcing the count stored in the record counter RK, and represented by the CC1 to CC4 signals, into the B buffer BB for transmission via the C buffer CB to the tape punch TP. The role performed by this count character will be described in the section concerned with the Search-Edit operations of the system. Following the generation of the SPC signal, the ILB signal is generated and performs the same function as described above. With the disappearance of the ILB signal, there is generated the LPL and CLE signals. It should be noted that even though the CLE signal is fed to the record counter RK, the presence of the MAX signal there, prevents the counter from recording this record.

The CLE signal, in addition to performing its usual functions, is fed to the acknowledge mode control AK, where it cooperates with the MAX signal and the EBD signal, to cause the generation of the EOB signal. The EOB signal, indicating an end of block, is fed to the general mode control GM where it causes the generation of the ENBT signal which resets the RCV flip-flop, terminating the RCV signal, and is fed to the acknowledge mode control AK to set the acknowledge flip-flop, causing the generation of the ACK signal. The resetting of the RCV flip-flop and the setting of the acknowledge flip-flop, indicates the start of the Acknowledge mode, and a turnaround cycle is initiated.

The Acknowledge mode may also be entered in a second manner, that is, when the B buffer BB detects end of transmission characters and feeds them as coded combinations of the ENA and EMA sginals to the end circuitry ED. In this case, the end circuitry ED generates the ENS which performs its usual function and also generates an EOT signal which is fed to the general mode control GM to perform the same functions that the EOB signal does therein.

The Acknowledge mode, it will be recalled, is started with a turnaround cycle and is characterized by the receiver becoming temporarily a transmitter and signaling back to the transmitter which is now acting as a receiver, whether an error had been received. The ACK signal is fed to the general mode control GM where it cooperates with the REC signal to generate the RTS, RTT and RTSD signals. The RTT signal is fed back to the acknowledge mode control AK to clear the character counter. The ACK signal is also fed to the serializer SZ to permit it to transfer conrol characters which will be hereinafter described. The RTSD signal is fed to the transceiver DF causing it to generate carrier for echo suppression. Two hundred milliseconds later the transceiver DF sends back a "start to send" signal STSD and the receiver now transmits approximately four hundred milliseconds of reference characters to cause the transmitter, now acting as a receiver, to fall into synchronization with the receiver now acting as a transmitter. At the end of these four hundred milliseconds, the first control character is transferred. This control character may be an error character. In particular, if an error had been received during the last group of blocks preceding the Acknowledge mode, an ERR signal will be generated by the error and clear circuitry EC and fed to the serializer SZ where it cooperates with a CTA signal from the function assignor FA and the ACK signal to cause the generation of the error character (see Table 1) which is fed via the DAD signal line to the transceiver DF. The next, second, control character as the INE signal also received from the function assignor FA by the serializer SZ is fed to the transceiver DF to indicate the end of the Acknowledge mode. The INE signal is also received by the acknowledge mode control AK where it cooperates with the REC signal, there present, to reset the Acknowledge flip-flop, terminating the ACK signal and ending the Acknowledge mode.

The termination of the ACK signal in the general mode control GM cooperates with the REC signal therein to again set the Receive flip-flop, causing the generation of the RCV signal, re-initiating the Receive mode. The transmitter at this time, enters a turnaround cycle followed by the retransmission of the last message, if it had received the error character. After the retransmission of this message and its reception by the receiver, there will again be another Acknowledge mode and turnaround cycle. If there is no error this time and if the Acknowledge mode was initiated by the end of transmission characters, the receiver then starts the disconnect procedure.

In particular, when the end of transmission characters are detected by the end circuitry ED, the ETD signal is fed to the acknowledge mode control AK, where during the occurrence of the CLE signal there is generated the EOT signal. The EOT signal, in addition to performing its usual functions, will cause the generation of an ETT signal, provided the acknowledge mode control AK is not receiving an error signal ERR from the error and clear circuitry EC. During the occurrence of the INE signal which ends this error-free Acknowledge mode, the ETT signal will cause the generation of an EOTR signal which is fed to the error and clear circuitry EC, causing the generation of the GCL and CLR signals which are fed throughout the receiver to return it to its initial condition. The error and clear circuitry EC at this time will open up the connection between the lines DCL1 and DCL2 from the transceiver DF, disconnecting it from the telephone lines TL1 and TL2. Finally, the EOTR signal is fed to the general mode control GM to set the Idle flip-flop generating the IDLE signal which is characteristic of the Idle mode, preparing the receiver for a later transaction.

SEARCH EDIT OPERATION (FIGURE 7)

During the reception of messages, some of the records of the message may contain errors. As has been described above, these erroneous records are followed by an Ignore character. The search-edit procedure by taking advantage of the presence of the Ignore characters is capable of producing an error-free paper tape by deleting those records having appended Ignore characters.

The reel of paper tape containing the received messages is removed from the tape punch TP and placed on the feed side of the tape reader TR. It should be noted that this will cause the paper tape to be read in the reverse direction. Such a procedure is required because it is necessary to read the Ignore character first to determine whether the record will be deleted or not. As the paper tape is read from the tape reader TR, those records not having an appended Ignore character will be punched on a new paper tape by the tape punch TP, whereas those records containing Ignore characters will not be punched.

With the tape reader TR and the tape punch TP prepared for operation, the fast read switch SW13 and the copy switch SW12 (see FIG. 1) are thrown, causing the generation respectively of the FSR signal and the CPYA signals which are fed to the search-edit unit SE. In response to the CPYA signal, the search-edit unit SE generates a CPY signal which is fed to the C buffer CB to clear initially clear storage flip-flops. The CPY signal, within the search-edit unit SE, causes the generation of a GOP pulse signal and the generation of CPO and CPP signals. The GOP pulse signal is fed to the reader controls RC to start the tape reader TR moving in the forward direction by generating a PTFW signal. The CPP signal is fed to the C buffer CB to sensitize circuitry therein to the PSS timing signals from the tape punch TP.

The CPO signal is fed to the general mode control GM, the function assignor FA and the acknowledge mode control AK, to ensure that there is no spurious initiation of the Receive, Transmit or Acknowledge modes. The CPO signal is also fed to the reader controls RC to prevent any undesired stopping of the paper tape reader TR during the search-edit operation. The timer TM is constrained to operate on its own by virtue of the CPO signal which ensures that the timer TM generates strobe pulses from its own crystal controlled oscillator and also that the bit signals of the characters begin at a precise time. At the same time, the CPP signal cooperates with the FSR signal in the search-edit unit SE to cause the generation of an SED signal which is fed to the retransmit controls RT to alert end-sentinel detection circuitry therein and to the record counter RK to cause the generation of an ENHB signal which alerts counting input circuitry therein and is also to the end circuitry ED to prevent the spurious detection of end-sentinel characters which may occur within the blocks of the records.

For the sake of clarity, it will be assumed that the first record is error-free and no Ignore character is therefore sensed. The first character is read from the tape reader TR and fed in the usual manner via the PTA1 to PTA7 signal lines to the A buffer AB while a PTST sprocket signal is fed to the reader-controls RC causing the generation of an STR signal which strobes the information bits from the tape reader TR. The character is transferred in the usual manner from the A buffer AB via the BAA to BAG signal lines to the B buffer BB. When the character is in the B buffer BB, the four least significant bits are fed via the BBA to BBD signal lines to the block counter BC, where their function is hereinafter more fully described. At the same time, the bits of the character are also fed via the BBA to BBG signal lines to the search-edit unit SE for special character detection such as the first FST character or the Ignore IGR character. (It will be assumed at present that neither of these characters is present.) The C buffer CB in response to the periodically occurring PSS signals from the tape punch TP, generates a CLB signal which is fed to the B buffer BB causing the clearing of this buffer and the transfer of the character via the BBA to BBG signal lines to the C buffer CB. Each time the B buffer BB is emptied an EMP signal is transferred to the parity circuitry PC which causes the generation of a sampling pulse which is fed via the SPL signal line to the search-edit unit SE to permit the sampling for the above mentioned special characters. Also in response to the PSS signals from the tape punch TP, the C buffer CB then generates a CLC signal which causes the transfer of the contents of the C buffer CB via the PDA to PDG signal lines to the tape punch TP. In this manner, information is transmitted a character at a time from the tape reader TR via the A buffer AB, the B buffer BB, and the C buffer CB to the tape punch TP.

Finally, the first FST character of the message is read by the tape reader TR and fed via the A buffer AB to the B buffer BB. (At this point, it would be beneficial to review the description of the format of a message as described in the General Structure of Information section.)

The first FST character is fed to the search-edit unit SE via the BBA to BBG signal lines and is sampled by an SPL signal from the parity circuitry PC causing the setting of a flip-flop in the search-edit unit SE to temporarily remember the occurrence of this character. (It should be noted that at the start of the reading of the tape, the CPY pulse that was generated, simulates this first FST character.) It will be assumed that the next record is in error. Therefore the next character read will be an Ignore character which is also fed from the B buffer BB to the search-edit unit SE. The occurrence of the Ignor character following the sensing of the first FST character, is indicative of an erroneous block. The combination of these two characters causes the generation within the search-edit unit SE of the ZIG signal which records the fact that the message is not to be punched.

Each time that a CLB signal is generated by the C buffer CB there is also generated a CLZ signal which is fed to the search-edit unit SE. The CLZ signal cooperates with the ZIG signal therein to cause the generation of a PIN signal which is characteristic of inhibiting the punching of the characters received by the C buffer CB. The PIN signal is fed to the C buffer CB to prevent the transfer of the characters from the C buffer CB to the tape punch TP. The CLZ also cooperates with the ZIG signal and the CPP to cause the generation of an SPP signal which is fed to the block counter BC to clear it to zero and permit the insertion therein of a block count. The next character arriving in the B buffer BB will represent a count of the number of blocks in the record, since the record is erroneous. The binary representation of this count is fed via the BBA to BBD signal lines to the block counter BC and is stored therein.

The next three characters received are end-sentinel characters, that is, they may indicate the end of a record or a block or they may indicate the end of transmission. The end-sentinel characters will be punched in spite of the fact that the record will be ignored. Therefore, it is necessary to override temporarily the effect of the PIN signal during the occurrence of these characters. Accordingly, it should be recalled that the end-sentinel characters are detected by the B buffer BB and fed to the retransmit controls RT as the ENA and EMA signals. When the first end-sentinel character is received by the retransmit controls RT, it generates an RBA or RSA signal depending on whether the end-sentinel indicates the end of a block or the end of a message, which is transmitted to the search-edit unit SE where it cooperates with the next occurring CLZ signal from the C buffer CB to generate the PAL signal. The PAL signal is fed to the C buffer CB to override the effect of the PIN signal. After the third end-sentinel is detected in the retransmit controls RT, there is generated either an RTD or a RBD signal which is fed to the search-edit unit SE to terminate the PAL signal, through the agency of a periodically occurring CEMP signal received from the C buffer CB. Therefore, the PIN signal assumes complete control, again inhibiting the punching of characters received by the C buffer CB. As the remainder of the record is read, each time the combination of end-sentinels indicating an end of block is sensed, an RBD signal is generated which is fed to the block counter BC. As each RBD signal is received at the block counter BC, a unit of subtraction is performed. This continues until the count in the block counter BC reaches zero and at that time a CTZ signal is generated, which is fed to the retransmit controls RT. When the next RBD signal is generated by the retransmit controls RT it cooperates with the SED signal and the CTZ signal to indicate that the start of the message has been reached and causes the generation of a PTS signal. The PTS signal is fed to the search-edit unit SE to terminate the PIN signal, unless an Ignore character has been sensed at the end of the block. This procedure continues until the end of the paper tape is reached.

APPENDIX

*Tape punch TP.*—The tape punch TP is a Teletype High Speed Tape Punch Set (BRPE) as described in Bulletin 215B, entitled, "Techincal Manual High Speed Tape Punch Set (BRPE)," copyrighted in 1952, 1954 and 1960 by Teletype Corporation. On page 6–12 of this bulletin is FIGURE 6–10, entitled, Schematic Wiring Diagram: Typical Tape Punch Set. In this figure, there are shown the inputs to the Tape Punch Set. The following table indicates the connections between the coupler DV and the Tape Punch Set.

*Table 3*

| Tape Punch Set Input: | Signal Leads to the Coupler DV |
|---|---|
| 18 | —28 volts. |
| 5 | PDA. |
| 4 | PDB. |
| 3 | PDC. |
| 2 | PDC. |
| 1 | PDE. |
| 6 | PDF. |
| 8 | PDH. |
| 9 | PDS. |
| 11 | Ground. |
| 12 | Ground. |
| 24 | PSS. |

*Tape reader TR.*—A typical tape reader may be the Perforated Tape Reader Model 3500, manufactured by the Digitronic Corporation and described in the publication entitled "Perforated Tape Reader."

*Mechanical counter.*—The mechanical counter may be of the type manufactured by the Sodeco Geneve Company under the name of a printing impulse counter "Sodeco-Print."

*Transceiver DF.*—The transceiver DF is a digital subset model 202A, having the options Z, K, J, G, D and N as manufactured by the American Telephone and Telegraph Company. The digital subset is described completely in a book entitled, Bell System Practices Section 592–012–200, Issue 1, November 1961. The subset is used with equalization and operates in a frequency shift manner between a frequency of 1200 cycles per second and a frequency of 2200 cycles per second. The subset includes a telephone that may be used in the normal manner to establish the connection between the sending and receiving ends of a telephone line. It includes at least three buttons, a data-button, an automatic button and a talk-button. It functions as an ordinary telephone whenever the talk-button is pressed. When the automatic button is pressed the subset can receive calls without the receiver being off the cradle.

The subset is provided with a Cinch connector for connection to the customer's equipment. It is necessary to employ a Cinch connector DB–19604–432 having a hood DB–51226–1. The following table indicates the connections of the leads from the coupler DV to the terminals of the connector.

*Table 4*

| Connector Terminals: | Signals from Coupler |
|---|---|
| 2 | DAD. |
| 3 | DIND. |
| 4 | RTSD. |
| 5 | STSD. |
| 6 | INT. |
| 7 | Signal Ground. |
| 8 | CAD. |
| 19 | DCL2. |
| 20 | DCL1. |
| 21 | READY. |
| 22 | RING–1. |
| 23 | RING–2. |

The remaining units are fully shown and described in our copending application Ser. No. 180,435, for Information Transfer System, filed Mar. 19, 1962. The following table indicates the figures of the copending application wherein these units are shown.

*Table 5*

| | FIG. No. |
|---|---|
| Control Panel CP | 9 |
| General Mode Control GM | 10 |
| A buffer AB | 11 |
| B buffer BB | 12 |
| End circuitry ED | 13 |
| Retransmit Control RT | 14 |
| Acknowledge mode Control AK | 15 |
| Ignore and insert circuits II | 16 |
| Serialize SZ | 17 |
| Function assignor FA | 18 |
| Error and clear circuitry EC | 19 |
| Reader Controls RC | 20 |
| Record Counter RK | 21 |
| Parity circuitry PC | 22 |
| C buffer CB | 23 |
| Search edit circuits SE | 24 |

CONCLUSION

Although only one embodiment of the various aspects of the invention has been shown and described in detail, there will now be obvious to those skilled in the art many modifications and variations which satisfy many or all of the objects, and to which accrue the advantages of the invention, but which do not depart from the spirit of the invention as defined by the appended claims.

What is claimed is:

1. A system for serially transferring information consisting of data units of information which are grouped into records with a record unit of information at an end of a plurality of data units of information, said system comprising: an input means, said input means including a record medium for storing in a serially available manner the units of information to be transferred and means for causing the record medium to move in a first direction and to serially transfer the units of information in a first order of significance or in a second and reverse direction and to transfer the units of information in a second and opposite order of significance; a control means comprising means initially causing said input means to move the record medium in the first direction to serially transfer the units of information in said first order of significance sensing means for sensing for the record units of information during the transfer of the units of information, counting means for accumulating a count of the record units of information sensed, said counting means temporarily storing a count representative of the number of records in the block of records transferred in the time interval; and means for sensing for errors in the units of information in the transferred block; said control means further including means responsive to said error means for causing said input means to move the record medium in the reverse direction and serially transfer the units of information in the opposite order of significance, means for causing a deaccumulation of said stored count so that after said count reaches zero a control signal is generated, and means responsive to said control signal for causing said input means to stop moving the record medium in said reverse direction and start moving the record medium in said first direction.

2. The system of claim 1 further comprising means for generating a time interval and means for indicating a block of records of information when the first record unit of information is sensed after the end of the time interval.

3. The system of claim 2 further comprising means for counting the number of times said block is retransferred to terminate the transferring of units of information when the number of times said block is transferred exceeds a given number.

4. The system of claim 2 further comprising remote receiving means for receiving the units of information.

5. The apparatus of claim 4 wherein said remote receiving means includes said error sensing means.

6. The apparatus of claim 4 including means for preventing said remote receiving means from receiving units of information while said input means is moving the record medium in the reverse direction.

7. A system for transferring messages consisting of units of information, represented by signals, that are serially transferred and grouped into records wherein a plurality of records constitute a block comprising: means for serially transmitting said units of information; receiving means for receiving and storing said units of information serially on a storage medium; counting means for accumulating the count of the records transferred in each block; detecting means for detecting errors in the units of information transferred; and means responsive to said counting means and said detecting means for inserting a record count unit of information in a block in which at least one of said errors is detected to indicate the number of records in said block.

8. The system of claim 7 wherein said receiving means for receiving and storing said units of information comprising storage means including a tapelike record medium, transducing means responsive to said receiving means and means for moving said record medium past said transducer means for storing said units of information serially along said record medium.

9. A system for transferring messages consisting of units of information, represented by signals, that are serially transferred and grouped into records wherein a plurality of records constitutes a block whose leading element of information represents the number of records in the block when the block contains an erroneous unit of information, said system comprising: means for serially transmitting said units of information; means for receiving said units of information; and means for sensing for the leading element of information in said blocks to prevent the reception of units of information by said receiving means for the number of records indicated by said first unit of information.

10. The system of claim 9 further comprising storage means responsive to said receiving means for storing the received units of information and means for sening for the first unit of information in said blocks to prevent the transfer of units of information from said receiving means to said storage means for the number of records indicated by said first unit of information.

11. The system of claim 10 wherein said leading element of information includes a block whose first unit of information is an error indicating unit of information when an erroneous unit of information is present in a block and whose second unit of information represents the number of records in the block when the block contains an erroneous unit of information and wherein said sensing means includes: means for sensing for the first unit of information in said block to generate a control signal and means responsive to said control signal for sensing for said second unit of information to prevent the transfer of units of information from said receiving means to said storage means for the number of records indicated by said second unit of information.

12. A system for transferring messages consisting of units of information, represented by signals, that are serially transferred and grouped into records wherein a plurality of records constitute a block, said system comprising: means for serially transmitting said units of information; storage means including a tapelike record medium, transducing means for recording units of information on said tapelike record medium and reproducing units of information from said tapelike record medium; transport means for moving said tapelike record medium in a first direction or in a second and reverse direction past said transducer means; means for connecting said transducer means to said transmitting means and for causing said transport means to move said tapelike record medium in said first direction past said transducer means for causing said units of information to be recorded along said tapelike record medium; detecting means for detecting erroneous unit records of information in the transferred blocks; counting means for accumulating a count of the number of records in each of said blocks; means responsive to said counting means and said detecting means for transferring a record count unit of information to said transducer means for recording a record count unit of infomation on said tapelike record medium at the end of a block containing an erroneous unit of information means for indicating the number of records in said block; units of information utilization means for stopping said transport means at the end of the message and for causing said transport means to move in the reverse direction; and means for connecting said utilization means to said transducer means for receiving the units of information reproduced by said transducer means; and means for detecting said record count unit of information to prevent said utilization means from accepting units of information from said transducer means for the number of records indicated by the record count unit of information.

13. A system for transferring messages consisting of units of information, represented by signals, that are serially transferred and grouped into records which include a record unit of information wherein a plurality of records constitute a block, said system comprising: means for serially transmitting said units of information; storage means including a tapelike record medium, transducing means for recording units of information and reproducing units of information from said tapelike record medium; first transport drive means for moving said tapelike record medium in a first direction past said transducer means, second transport drive means for moving said tapelike record medium in a second and reverse direction past said transducer means; means for connecting said transducer means to said transmitting means and for causing said first transport drive means to move said tapelike record medium in said first direction past said transducer means for causing said units of information to be recorded along said tapelike record medium; detecting means for detecting erroneous unit records of information in the transferred blocks; means responsive to said detecting means for transferring an error indicating unit of information to said transducer means for recording on said record medium at the end of a block containing an erroneous unit of information; bidirectional counting means for counting record units of information; means for causing said counting means to accumulate a count when said record medium is moving in said first direction; means responsive to said counting means and said detecting means for transferring a record count indicating unit of information to said transducer means for recording on said record medium after said error indicating unit of information when a block contains an erroneous unit of information for indicating the number of records in said block; means for stopping said first transport drive means at the end of the message; means causing said second transport drive means to move said tapelike record medium in the reverse direction past said transducer means; units of information utilization means; means for connecting said utilization means to said transducer means for receiving the units of information reproduced by said transducer means; means responsive to said transducer means for detecting error indicating units of informaton to generate a control signal; means responsive to said control signal to transfer said record count indicating unit of information to said bidirectional counting means for the presetting thereof to to the record count; means for causing said bidirectional counting means to deaccumulate as the record units of information are reproduced; and means responsive to said control signal and said bidirectional counting means to prevent the reception by said utilization means of units of information from the time said control signal is generated until said bidirectional counting means deaccumulates to a count of zero.

References Cited

UNITED STATES PATENTS

| | | | |
|---|---|---|---|
| 2,235,755 | 3/1941 | Bakker et al. | 340—146.1 |
| 2,975,407 | 3/1961 | O'Brien | 340—174.1 |
| 3,029,019 | 4/1962 | Dayger et al. | 340—172.5 |
| 3,141,151 | 7/1964 | Gilson | 340—172.5 |

ROBERT C. BAILEY, *Primary Examiner.*

P. L. BERGER, J. P. VANDENBURG, *Assistant Examiners.*

UNITED STATES PATENT OFFICE
CERTIFICATE OF CORRECTION

Patent No. 3,324,460 June 6, 1967

Eugene Leonard et al.

It is hereby certified that error appears in the above numbered patent requiring correction and that the said Letters Patent should read as corrected below.

Figure 3:
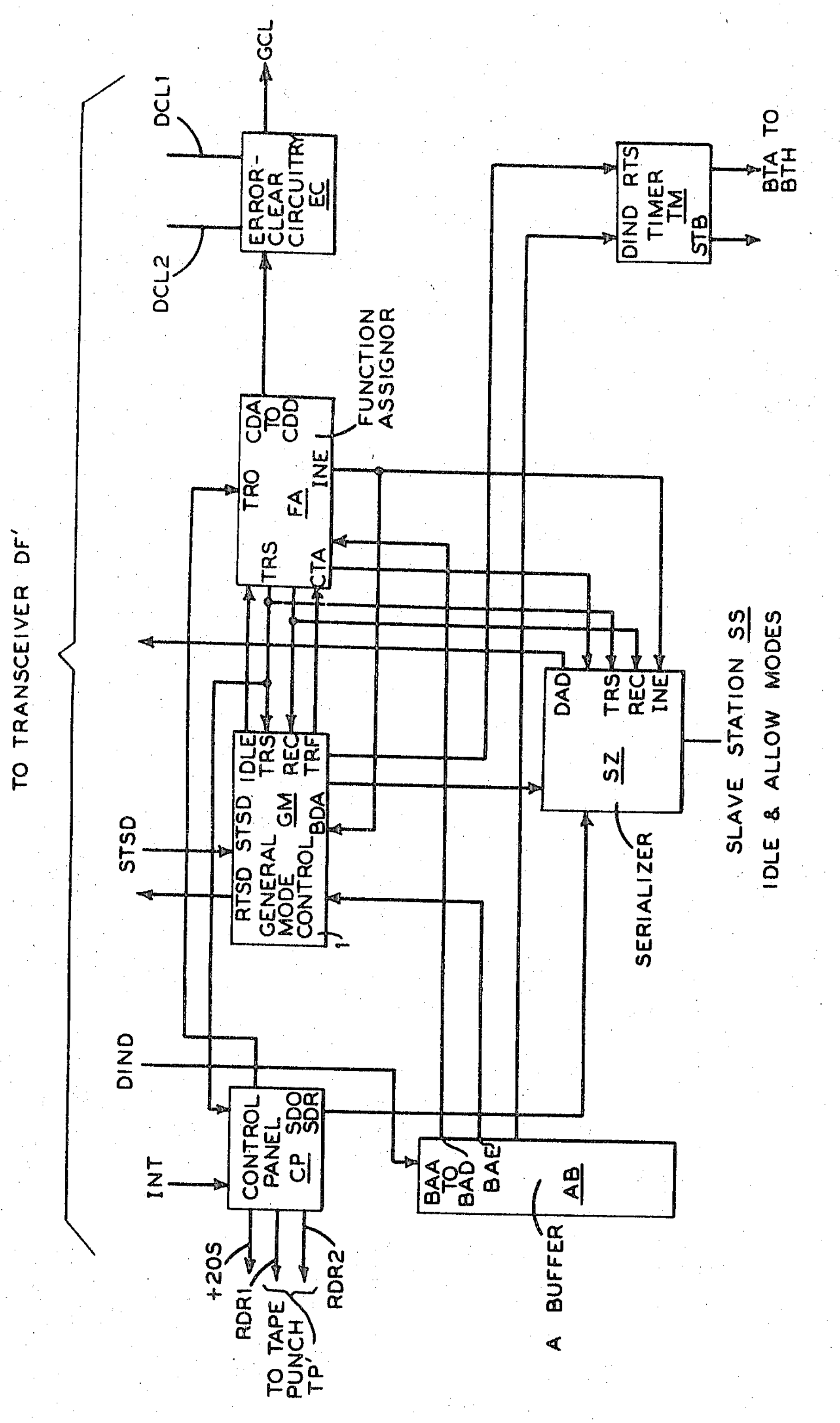
FIGURE 3 shows the signal flow between the pertinent units of the slave station during the Idle and Allow modes.

In Fig. 1 change the designation between the left hand Tape Punch TP unit and the left hand Coupler DV from POA to PDA. Also, change SW 12 and SW12′ ("copy" position) in the left and right hand coupler DV and DV′ to read SW 22 and SW22′ respectively. In Fig. 2 add the designation BAE to the line interconnecting the A Buffer AB and the General Mode Control GM. In Fig. 3 change the input terminal of Timer TM from DIND to DIN. In Fig. 4 below A Buffer AB delete the designation BTG AB. In the B Buffer BB change the lower right terminal from BTG to BTH. Change an electrical connection between Parity Circuitry PC and Insert & Ignore Circuitry II such that the connection on the ILB line (right hand line) is removed and reestablished on the center line (SPL terminal). The connection thus made establishes a line from the SPL terminal of the PC unit to the Acknowledge Mode Control AK unit. Further, the line entering the A Buffer AB from the bottom should originate in Timer TM from a seperate terminal labeled BTH not the terminal labeled BTA to BTG. The BTA to BTG line goes directly to Serializer SZ. Any interconnection between the newly created BTH and the existing BTA to BTG line should be removed. In Fig. 6 change a designation in the Parity Circuitry PC (upper right corner) from LPL to LPR. Add a dot to the interconnection of the line extending from the CLE terminal of Parity Circuitry PC and the line extending between the CLE terminal of Record Counter RK and Acknowledge Mode Control AK so that the CLE terminal of Parity Circuitry PC is connected to Acknowledge Mode Control AK and Record Counter RK in addition to End Circuitry ED ; column 1, line 15, for "Mar. 12" read -- Mar. 19 --; column 6, line 10, for "TP1" read -- TR1 --; line 29, for "TR1" read -- TP1 --; column 14, line 30, for "DIND" read -- DIN --; column 15, line 61, for "TP1" read -- TR1 --; column 17, line 32, for "-EMP" read -- EMP --; column 21, line 35, for "RBR" read -- RBD --; column 22, line 47, for "DIND" read -- DIN --; column 24, line 56, for "generates" read -- causes the generation of --; column 26, line 2, for "SW12" read -- SW22 --; column 29, line 49, after "significance" insert a comma; column 30, line 47, for "sening" read -- sensing --.

Signed and sealed this 8th day of April 1969.

(SEAL)
Attest:

EDWARD M.FLETCHER,JR.
Attesting Officer

EDWARD J. BRENNER
Commissioner of Patents